US 9,026,284 B2

(12) United States Patent
Kumar et al.

(10) Patent No.: US 9,026,284 B2
(45) Date of Patent: May 5, 2015

(54) METHODS AND SYSTEMS FOR THROTTLE CONTROL AND COUPLING CONTROL FOR VEHICLES

(75) Inventors: Ajith Kuttannair Kumar, Erie, PA (US); Bret D. Worden, Erie, PA (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 13/570,340

(22) Filed: Aug. 9, 2012

(65) Prior Publication Data
US 2012/0303237 A1    Nov. 29, 2012

Related U.S. Application Data

(63) Continuation-in-part of application No. 11/533,922, filed on Sep. 21, 2006, now Pat. No. 8,280,569.

(51) Int. Cl.

| | |
|---|---|
| *G05D 1/00* | (2006.01) |
| *G05D 3/00* | (2006.01) |
| *G06F 7/00* | (2006.01) |
| *G06F 17/00* | (2006.01) |
| *B61L 3/00* | (2006.01) |
| *B61L 17/00* | (2006.01) |
| *B61D 17/12* | (2006.01) |

(52) U.S. Cl.
CPC .............. *B61L 3/006* (2013.01); *B61L 17/00* (2013.01); *B61D 17/12* (2013.01); *Y02T 30/30* (2013.01)

(58) Field of Classification Search
USPC ...................................................... 701/19, 20
See application file for complete search history.

(56) References Cited

U.S. PATENT DOCUMENTS

| | | | | |
|---|---|---|---|---|
| 3,654,456 | A | * | 4/1972 | Sarbach ................. 246/182 BH |
| 4,687,258 | A | | 8/1987 | Astly |
| 4,711,418 | A | | 12/1987 | Aver, Jr. et al. |
| 5,018,689 | A | * | 5/1991 | Yasunobu et al. ........ 246/182 B |
| 5,029,532 | A | | 7/1991 | Snead |

(Continued)

FOREIGN PATENT DOCUMENTS

| | | |
|---|---|---|
| WO | WO9960735 A1 | 11/1999 |
| WO | WO2010039680 A1 | 4/2010 |
| ZA | 200101708 A | 8/2001 |

OTHER PUBLICATIONS

Vantuono, William C. railway Age, Metro-North's stealthy switcher, Oct. 2000, http://www.findarticles.com/p/articles/mi_m1215/is_10_201/ai_66769, 2 pages.

*Primary Examiner* — Nicholas Kiswanto
(74) *Attorney, Agent, or Firm* — GE Global Patent Operation; John A. Kramer

(57) ABSTRACT

A multi-mode control system for a locomotive includes a throttle control device having notch settings corresponding to, for a first, long haul mode, control signals for providing respective tractive effort or power from the locomotive, a master controller in communication with the throttle control device and adapted to receive said control signals from the throttle control device and to transmit respective command signals to power-train components of the locomotive to achieve the respective tractive effort or power, the master controller also adapted for sending alternative command signals when a user-operable mode selector is set to one of one or more alternative modes. The user-operable mode selector includes one or more user interface devices in communication with the master controller for selecting one alternative mode of the one or more alternative modes.

37 Claims, 8 Drawing Sheets

(56) References Cited

U.S. PATENT DOCUMENTS

| | | | | |
|---|---|---|---|---|
| 5,050,823 | A | 9/1991 | Parker | |
| 5,452,870 | A * | 9/1995 | Heggestad | 246/182 R |
| 5,629,567 | A | 5/1997 | Kumar | |
| 5,681,015 | A | 10/1997 | Kull | |
| 5,720,455 | A | 2/1998 | Klemanski et al. | |
| 5,738,311 | A | 4/1998 | Fernandez | |
| 5,740,547 | A | 4/1998 | Kull et al. | |
| 5,758,848 | A * | 6/1998 | Beule | 246/182 B |
| 5,785,392 | A | 7/1998 | Hart | |
| 5,813,635 | A | 9/1998 | Fernandez | |
| 5,820,226 | A | 10/1998 | Hart | |
| 5,833,325 | A | 11/1998 | Hart | |
| 5,927,822 | A | 7/1999 | Hart | |
| 5,934,764 | A | 8/1999 | Dimsa et al. | |
| 5,950,967 | A | 9/1999 | Montgomery | |
| 5,969,643 | A | 10/1999 | Curtis | |
| 5,978,718 | A | 11/1999 | Kull | |
| 5,986,577 | A | 11/1999 | Bezos | |
| 5,986,579 | A | 11/1999 | Halvorson | |
| 5,995,881 | A | 11/1999 | Kull | |
| 6,114,974 | A | 9/2000 | Halvorson | |
| 6,128,558 | A | 10/2000 | Kernwein | |
| 6,163,089 | A | 12/2000 | Kull | |
| 6,216,095 | B1 | 4/2001 | Glista | |
| 6,275,165 | B1 | 8/2001 | Bezos | |
| 6,308,639 | B1 | 10/2001 | Donnelly et al. | |
| 6,322,025 | B1 | 11/2001 | Colbert et al. | |
| 6,360,724 | B1 * | 3/2002 | Suhre et al. | 123/481 |
| 6,360,998 | B1 | 3/2002 | Halvorson et al. | |
| 6,377,215 | B1 | 4/2002 | Halvorson et al. | |
| 6,459,965 | B1 * | 10/2002 | Polivka et al. | 701/19 |
| 6,556,899 | B1 | 4/2003 | Harvey et al. | |
| 6,782,044 | B1 | 8/2004 | Wright et al. | |
| 7,236,859 | B2 * | 6/2007 | Horst et al. | 701/19 |
| 7,416,262 | B2 | 8/2008 | Ring | |
| 7,520,472 | B2 * | 4/2009 | Peltz et al. | 246/187 A |
| 7,840,338 | B2 * | 11/2010 | Paolacci | 701/117 |
| 7,974,774 | B2 * | 7/2011 | Kumar | 701/123 |
| 8,157,218 | B2 | 4/2012 | Riley et al. | |
| 8,428,798 | B2 | 4/2013 | Kull | |
| 8,478,463 | B2 * | 7/2013 | Knott et al. | 701/20 |
| 2003/0178534 | A1 * | 9/2003 | Peltz et al. | 246/187 A |
| 2003/0182030 | A1 * | 9/2003 | Kraeling et al. | 701/19 |
| 2005/0121971 | A1 | 6/2005 | Ring | |

* cited by examiner

METHODS AND SYSTEMS FOR THROTTLE CONTROL AND COUPLING CONTROL FOR VEHICLES

CROSS-REFERENCE TO RELATED APPLICATIONS

This application is a continuation-in-part of U.S. patent application Ser. No. 11/533,922, which was filed on 21 Sep. 2006, now U.S. Pat. No. 8,280,569 and is entitled "Methods And Systems For Improved Throttle Control And Coupling Control For Vehicles" (the "'922 application"). The entire disclosure of the '922 application is incorporated by reference into this application.

TECHNICAL FIELD

Embodiments of the invention relate to vehicle control. Other embodiments relate to control of trains and other rail vehicles.

BACKGROUND

Locomotives used for heavy haul, over-the-rail applications, and for passenger applications presently are controlled using a master controller and/or train line signals. The master controller may be a microcomputer, e.g., processor and memory device, which is operated according to software for receiving operations data and control signals, and sending command signals to effectuate commands from an operator. The control signals may come from a user- or operator-controlled master control stand that includes plural handles extending from the master control stand. The handles may include a throttle handle, a dynamic brake handle, and a reverser handle, and each is associated with a respective control device that senses the position of the respective handle and communicates with the master controller by sending control signals.

A throttle control device of the master control stand may have, for example, eight notches of operation for motoring, where the throttle handle may align with any one of the notches at one time. Each notch corresponds to a specific tractive effort (TE) and/or power (such as horsepower (HP) or watts) request to the master controller. The amount of TE produced depends on various conditions, but is primarily dependent on the speed of the locomotive and/or train including the locomotive and the throttle position or notch. The throttle handle controls, for example, the electric motors that drive the locomotive wheels, to set the motors either in motoring mode (throttle in a motoring notch 1 through 8 position) to drive the locomotive, or in generator mode (throttle in a dynamic brake position), where they will generate power and thereby retard the motion of the locomotive. The power so generated may be directed to a resistor grid on the locomotive, with heat from the grid dissipated externally. Lastly, the reverser handle, for example, may set the direction of torque production of the electric motors to drive the train forward or reverse. The reverser handle also includes a neutral position.

Such a system, including the throttle and throttle control device communicating with the master controller, works well for typical over the road, long-haul operations. However, it is less suited for lower power applications such as yard operations where the locomotives or trains need to be positioned or where frequent coupling of locomotives and other rolling stock is required. Even the lowest notch setting of a standard locomotive throttle mechanism may provide too much TE or power to effectuate a desired movement or coupling in a yard, resulting in relatively slow start-and-stop advancing to couplings, or undesired forceful couplings that may result in damage or excessive wear. Thus, the current control systems may be viewed to provide for relatively inefficient operations in a yard setting.

There exist switcher locomotives that are designed specifically for slow speed coupling and de-coupling uses in rail yards. These switcher locomotives are of a lower power and tractive effort design which allows for improved yard operability. Some such switcher locomotives are designed for radio control from a number of control towers in the yard. These radio controlled switcher locomotives may have relatively complex electronics controls, and may be provided with relatively slow speed options for yard operations. However, this latter type of switcher has various elements and constraints that limit its flexibility and efficiencies, such as with regard to long-haul operations.

It may be desirable to provide rail vehicles or other vehicles that operate differently from vehicles currently available.

BRIEF DESCRIPTION

Multi-mode control systems and methods are provided for more flexible control of vehicles, such as locomotives. In some embodiments a user-operable mode selector includes a user interface device that communicates with a master controller of a vehicle drive system, so that one or more alternative modes of operation may be effectuated through the use of the user-operable mode selector and a throttle control device also in communication with the master controller. In such embodiments, the throttle control device senses the location of a throttle handle that may be set to one of a plurality of notch positions.

In one such embodiment, when the user-operable mode selector is set in an alternative speed mode, each notch setting corresponds to a particular speed suitable for slow speed operations in a yard, including coupling operations. In another such embodiment, when the user-operable mode selector is set in an alternative distance mode, each notch setting corresponds to a particular distance suitable for slow speed operations in a yard, including coupling operations.

Other distance alternative modes may set distances by single or multiple inputs on touch keys, soft keys, or other user interface devices. Embodiments also are provided that alter the speed, tractive effort or power limits for one or more notch settings from the standard limits imposed for long haul operations.

Other embodiments also are provided that control speed or distance in various alternative modes that do not use the throttle handle during such operations, or that use the throttle handle in a non-stepwise manner.

In one embodiment, a control system includes a controller configured to be communicatively coupled with a throttle control device having multiple throttle settings and disposed onboard a vehicle. The controller also is configured to determine a selected throttle setting of the multiple throttle settings of the throttle control device. The controller is further configured to operate in plural operating modes that include at least two of a power mode, a speed mode, or a distance mode. When the controller is operating in the power mode, the controller is configured to transmit control signals to a propulsion system of the vehicle that direct the propulsion system to generate an amount of at least one of tractive power or tractive effort that corresponds to the selected throttle setting. When the controller is operating in the speed mode, the controller is configured to transmit control signals to the propulsion system that direct the propulsion system to move the vehicle at a designated speed that corresponds to the selected throttle setting. In one such embodiment, the standard notch setting enumerations 1 through 8 would indicate the target speed in units of miles per hour (alternatively kilometers per hour or another designation of speed). When the controller is operating in the distance mode, the controller is configured to transmit control signals to the propulsion system that direct the propulsion system to move the vehicle a designated distance that corresponds to the selected throttle setting and stop the vehicle at the designated distance. In one such embodiment, the standard notch setting enumerations 1 through 8 would indicate the target distance in units of car lengths. Alternatively, different designations or units of distance may be used. In another embodiment, the standard notch setting enumerations 1 through 8 would indicate the target distance in units of feet×10 (or another distance). In another embodiment, the distance set point (e.g., the designated distance associated with the selected throttle setting) may be entered into the control system by way of a separate operator interface, such as a keypad, or rotary potentiometer, or other method or input device which would enable the throttle to be used as a maximum speed limit to be enforced during the position move (e.g., during movement of the vehicle in response to selecting the throttle setting).

In one embodiment, the distance mode may be used to assist an operator of the vehicle to couple the vehicle with one or more other vehicular units. For example, if the vehicle is approximately a designated distance away from one or more other units to which the vehicle is to mechanically couple, the operator can select a throttle setting that represents the designated distance or a distance that is closer to the designated distance than one or more other distances associated with or represented by the other throttle settings. The selection of the throttle setting causes the vehicle to move the designated distance toward the other vehicular units in order to couple the vehicle with the units.

In one aspect, the control system is able to detect the coupling of the vehicle with the other units. For example and as described below, the control system may monitor changes in speed and/or inertia of the vehicle as the vehicle moves toward the units to which the vehicle is to couple (whether the vehicle is in the power mode, distance mode, or speed mode). When the vehicle couples with the other vehicular units, the detected change in speed and/or inertia can be used by the control system to detect the coupling. The control system may then automatically stop further movement of the vehicle toward the other units. This detection of coupling can be used in combination with the distance mode such that the operator can select the throttle setting associated with a designated distance that is approximately the same as (or is the same as) the actual distance between the vehicle and the other units. The control system may then cause the vehicle to move the designated distance of the throttle setting toward the other units. If coupling is detected at or before the designated distance, the control system may cause the vehicle to stop responsive to the detection of coupling. If no coupling is detected before the vehicle completes travel of the designated distance associated with the selected throttle setting, then the control system may cause the vehicle to continue to travel toward the other units, but at a slower speed.

The detection of coupling can be used in combination with the speed and/or power mode such that the operator can select the throttle setting associated with a designated speed or power output (e.g., tractive effort and/or tractive power). The control system may then cause the vehicle to move at the designated speed or power output toward the other units. If coupling is detected, the control system may cause the vehicle to stop responsive to the detection of coupling. If no coupling is detected, then the control system may cause the vehicle to continue to travel toward the other units.

In another embodiment, another control system includes a controller that is configured to be communicatively coupled with a throttle control device having multiple throttle settings and disposed onboard a vehicle. The controller also is configured to determine a selected throttle setting of the multiple throttle settings of the throttle control device. The controller is further configured to operate in a power mode and a speed mode. When the controller is operating in the power mode, the controller is configured to transmit control signals to a propulsion system of the vehicle that direct the propulsion system to generate an amount of at least one of tractive power or tractive effort that corresponds to the selected throttle setting. When the controller is operating in the speed mode, the controller is configured to transmit control signals to the propulsion system that direct the propulsion system to move the vehicle at a designated speed that corresponds to the selected throttle setting.

In another embodiment, another control system includes a controller that is configured to be communicatively coupled with a throttle control device having multiple throttle settings and disposed onboard a vehicle. The controller also is configured to determine a selected throttle setting of the multiple throttle settings of the throttle control device. The controller is further configured to operate in plural operating modes that include a power mode and a distance mode. When the controller is operating in the power mode, the controller is configured to transmit control signals to a propulsion system of the vehicle that direct the propulsion system to generate an amount of at least one of tractive power or tractive effort that corresponds to the selected throttle setting. When the controller is operating in the distance mode, the controller is configured to transmit control signals to the propulsion system that direct the propulsion system to move the vehicle a designated distance that corresponds to the selected throttle setting and stop the vehicle at the designated distance.

In another embodiment, a method (e.g., for controlling a vehicle) includes communicatively coupling a controller with a throttle control device having multiple throttle settings and disposed onboard a vehicle, determining a selected throttle setting of the multiple throttle settings of the throttle control device, and controlling motive operations of the vehicle from the controller in a power mode and at least one of a speed mode or a distance mode. When operating in the power mode, the method also includes transmitting control signals to a propulsion system of the vehicle that direct the propulsion system to generate an amount of at least one of tractive power or tractive effort that corresponds to the selected throttle setting. When operating in the speed mode, the method also includes transmitting control signals to the propulsion system that direct the propulsion system to move the vehicle at a designated speed that corresponds to the selected throttle setting. When operating in the distance mode, the method also includes transmitting control signals to the propulsion system that direct the propulsion system to move the vehicle a designated distance that corresponds to the selected throttle setting and stop the vehicle at the designated distance.

In another embodiment, a control system for a vehicle includes a controller that is configured to be communicatively coupled with a throttle control device having multiple throttle settings and disposed onboard a vehicle and to determine a selected throttle setting of the multiple throttle settings of the throttle control device. The controller is further configured to operate in a power mode and a speed mode. When the controller is operating in the power mode, the controller is configured to transmit control signals to a propulsion system of the vehicle that direct the propulsion system to generate an amount of at least one of tractive power or tractive effort that corresponds to the selected throttle setting. When the controller is operating in the speed mode, the controller is configured to transmit control signals to the propulsion system that direct the propulsion system to move the vehicle at a designated speed that corresponds to the selected throttle setting.

In another embodiment, a control system of a vehicle includes a controller that is configured to be communicatively coupled with a throttle control device having multiple throttle settings and disposed onboard a vehicle and to determine a selected throttle setting of the multiple throttle settings of the throttle control device. The controller is further configured to operate in plural operating modes that include a power mode and a distance mode. When the controller is operating in the power mode, the controller is configured to transmit control signals to a propulsion system of the vehicle that direct the propulsion system to generate an amount of at least one of tractive power or tractive effort that corresponds to the selected throttle setting. When the controller is operating in the distance mode, the controller is configured to transmit control signals to the propulsion system that direct the propulsion system to move the vehicle a designated distance that corresponds to the selected throttle setting and stop the vehicle at the designated distance.

In another embodiment, a method for controlling a vehicle includes communicatively coupling a controller with a throttle control device having multiple throttle settings and disposed onboard a vehicle, determining a selected throttle setting of the multiple throttle settings of the throttle control device, and controlling motive operations of the vehicle from the controller in a power mode and at least one of a speed mode or a distance mode. When operating in the power mode, the method includes transmitting control signals to a propulsion system of the vehicle that direct the propulsion system to generate an amount of at least one of tractive power or tractive effort that corresponds to the selected throttle setting. When operating in the speed mode, the method includes transmitting control signals to the propulsion system that direct the propulsion system to move the vehicle at a designated speed that corresponds to the selected throttle setting. When operating in the distance mode, the method includes transmitting control signals to the propulsion system that direct the propulsion system to move the vehicle a designated distance that corresponds to at least one of the selected throttle setting or another operator input, and to stop the vehicle at the designated distance.

DETAILED DESCRIPTION

Figure 1:
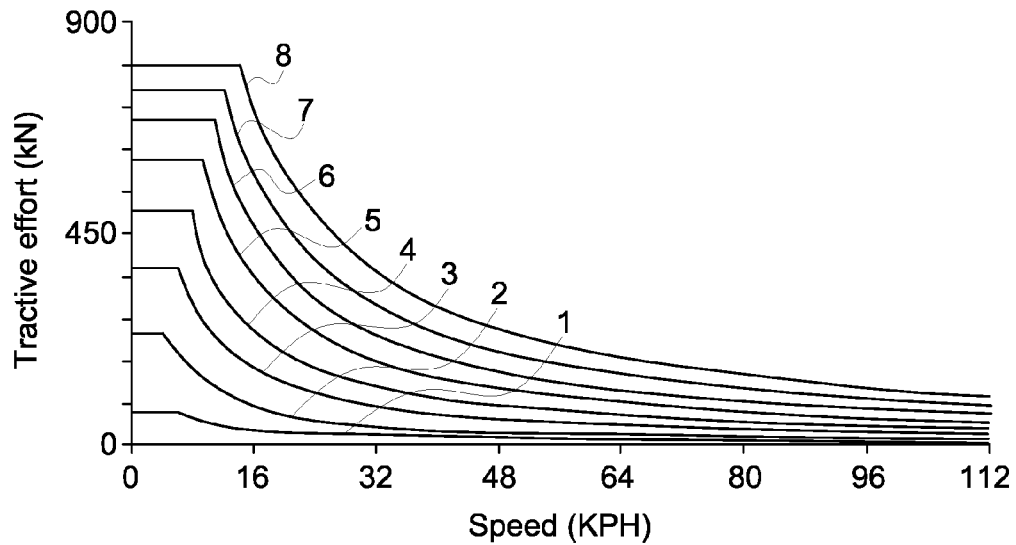
FIG. 1 provides a chart depicting the relationship between tractive effort and speed for eight notch settings of a throttle control device in a long haul mode.

Having identified limitations of some known throttle control systems for certain uses, such as in yard areas where slower and more intricate movements are required, the inventors of the presently described inventive subject matter have developed throttle control methods, systems and computer software code that may work together with, and be incorporated into, conventional throttle control systems and/or with new throttle control systems. These provide alternative operating modes that are better suited both for a variety of vehicles, such as locomotives dedicated to yard operations, and for over-the-rail, long haul, vehicles that may be used in coupling/decoupling operations both in yards and at remote points along a transportation system, such as a rail system.

Broadly speaking, the inventive subject matter provides a method, apparatus, and program for providing multi-mode operation of a vehicle, such as, but not limited to, a locomotive. To facilitate an understanding of the inventive subject matter, it is described hereinafter with reference to specific implementations thereof. Various embodiments of the inventive subject matter may be described in the general context of computer-executable instructions, such as program modules, being executed by a computer, such as is provided in a master controller of the vehicle. Generally, program modules include routines, programs, objects, components, data structures, etc., that perform particular tasks or implement particular abstract data types. For example, the software programs that underlie various embodiments of the inventive subject matter can be coded in different languages for use with different platforms.

Embodiments of vehicle control systems are provided that facilitate operator control in situations where units of the vehicle (e.g., rail cars) are to be coupled to and/or de-coupled from a propulsion unit of the vehicle (e.g., a unit that generate propulsive force to propel the vehicle, such as a locomotive) and, as may be present, other attached units. These embodiments provide additional modes operable from the notched throttle, thereby increasing the flexibility of the current operator controlled device. These embodiments thus provide for greater, and more efficient, operations with such vehicles, whether in a true yard environment, or in other locations where slower speed or distance-determinable operations are needed, such as for coupling and de-coupling of one or more rail cars from a train.

Embodiments of the inventive subject matter may provide one or more of the following yard-type control modes, which may be set into operation by a user-operable mode selector including a user interface device that may include touch or soft keys on a display (or by other devices described herein): speed control; distance control; speed control with couple detected stop; distance control with couple detected stop; distance control followed by speed control; and distance control followed by speed control with couple detected stop. Such modes each provide specific sets of control signals, which may be directed both to motoring and to braking functions (both dynamic and friction), to turn each of these on or off depending on the mode and the specific time and/or other parameter or status during the respective selected mode. These control modes can be provided in addition to or in place of other throttle operations, such as conventional throttle operations described below.

Figure 2:
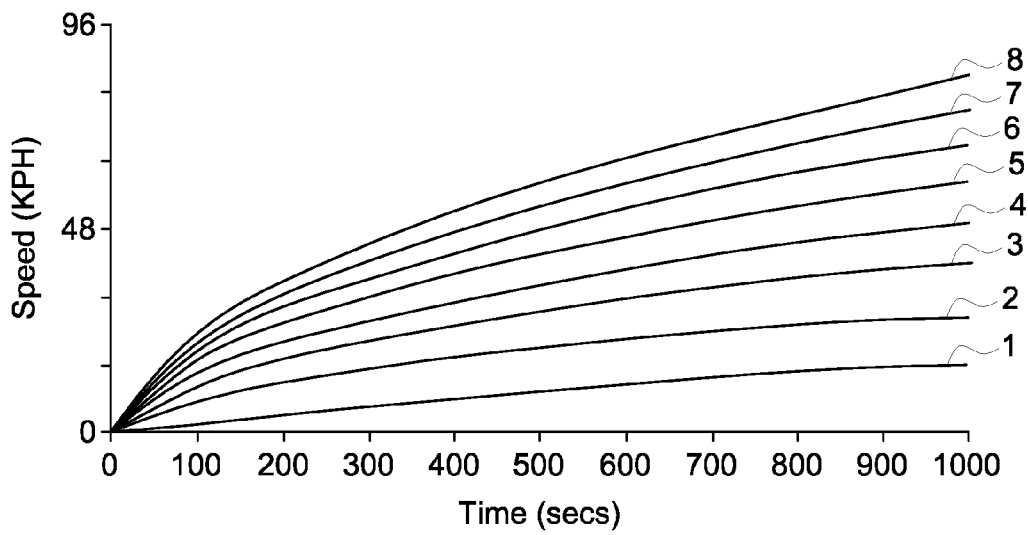
FIG. 2 provides a chart depicting the relationship between speed and time for the eight notch settings in the long haul mode of FIG. 1.
Figure 3:
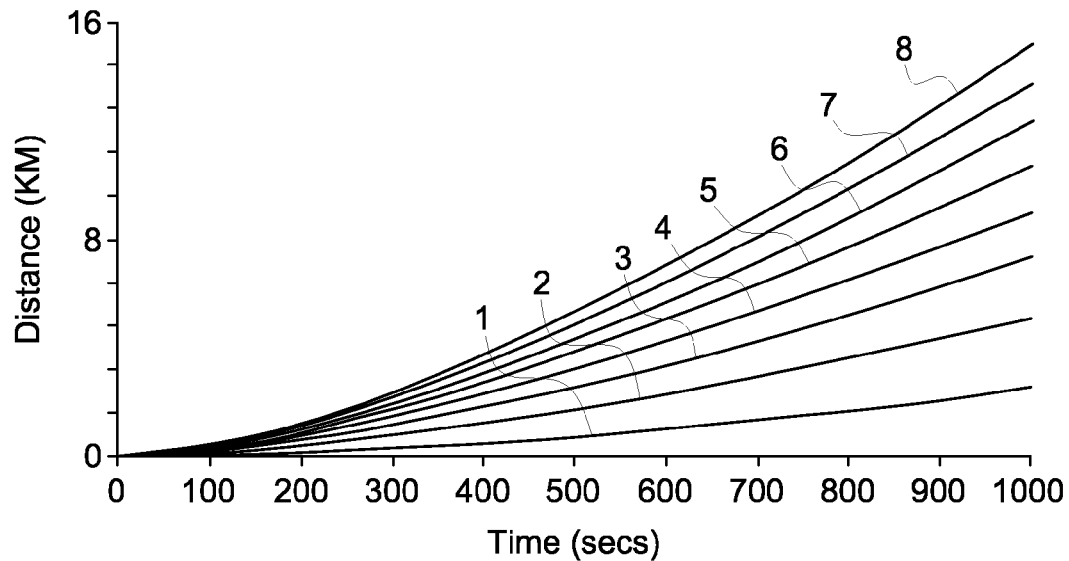
FIG. 3 provides a chart depicting the relationship between distance and time for the eight notch settings in the long haul mode of FIG. 1.

To provide perspective, and to help describe conventional throttle operations to which new modes are provided in various embodiments, FIGS. 1-3 depict operational and performance aspects of a notched throttle locomotive in which the notched throttle has eight motoring notches. FIG. 1 provides a representative plot of typical TE versus speed for each of the eight notch settings. At a given notch setting, the TE is applied, and under a given total load and track condition the speed increases. TE effort is shown to decline at speed between about 8 to 19 kilometers per hour (KPH) due to power or other speed-related torque limits, and thereafter speed increases and TE decreases until a particular speed is attained for each notch setting under the specified load and track conditions.

FIG. 2 plots the relationship between speed in KPH and time in seconds for the operations at different notch settings that are depicted in FIG. 1. Comparatively speaking, for the higher notch settings, higher speed is attained more quickly and higher speed is maintained, and attained, throughout the time period. FIG. 3 plots the relationship between distance traveled in kilometers and time in seconds for the operations at different notch settings that are depicted in FIG. 1. It is noted that the speeds and corresponding distances shown in these and other figures are examples and not absolute, as these will depend on load, grade, and other factors.

Based on the plots of FIGS. 1-3, it may be observed that for a particular notch setting, even for the lowest notch setting, it is difficult to control the locomotive to attain a desired low speed (for example less than 16 KPH) or a specified distance, as may be desired for efficient movements prior to and for coupling and de-coupling operations.

In the following discussion, the conventional throttle operations discussed with regard to FIGS. 1-3 also are termed "default mode." Also, while the example below describes a specific vehicle throttle/control system, such as a throttle/control system for a locomotive, the following may generally be stated about modern locomotive control systems. Modern locomotive control systems in general do not have direct mechanical, hydraulic, or pneumatic connections to the specific devices controlled. Rather, from the operator-to-machine interface (such as the cab in the lead locomotive), there are electronic/electric device connections from the point of the throttle handles onward to the devices being controlled. For example, and not to be limiting, a position-determining device (of any type as is known to those skilled in the art, or as may later be developed) may be provided within a master control stand housing a throttle handle. The position-determining device detects and interprets the position of the throttle handle, and conveys data signals, such as encoded control signals, indicative of the handle position, i.e., the notch setting, to an associated microcomputer, such as a central digital processor, that functions as a master controller. This microcomputer master controller, which may include a processor and a memory device, and may be operated with software, receives operations data and control signals, and sends command signals to effectuate commands from an operator. The master controller is programmed to interpret the encoded control signals regarding the throttle handle position and electronically issues corresponding command signals to an output driver to manipulate the devices that will effectuate the intended motoring result.

Similar respective electronic/electric device connections are established for the dynamic brake and the reverser handles. Further as to the position-determining devices, and without being limiting, it is noted that the respective positions of these three control handles may be sensed and monitored by rotary encoding devices, or by other devices, that are mechanically coupled to associated rotary axles (or other mechanical features) to which the control handles are secured, utilizing cams to actuate microswitches or contacts to provide a signal to the microcomputer controller described above. Such signal indicates the current position of the respective handle.

While the mode embodiments of the inventive subject matter are described below as "yard" or "yard-type" modes, to signify their value to improved operator-controlled operations in a rail yard, this is not meant to be limiting. The mode embodiments of the inventive subject matter that are suitable in rail yard also are advantageous in other, remote points along the rail system. The latter may include siding rails where a loading/unloading area for a specific manufacturing plant or storage/distribution operation is located, a customer branch line, or other non-yard points for coupling and uncoupling rail cars. Additionally, one or more embodiments described herein is not limited to locomotives or trains. For example, one or more of the modes described herein may be used to control movement of a non-rail vehicle, such as another off-highway vehicle (e.g., a vehicle that is either not designed for or not permitted to travel on public roads or highways), automobile, marine vessel, and the like.

Figure 4:
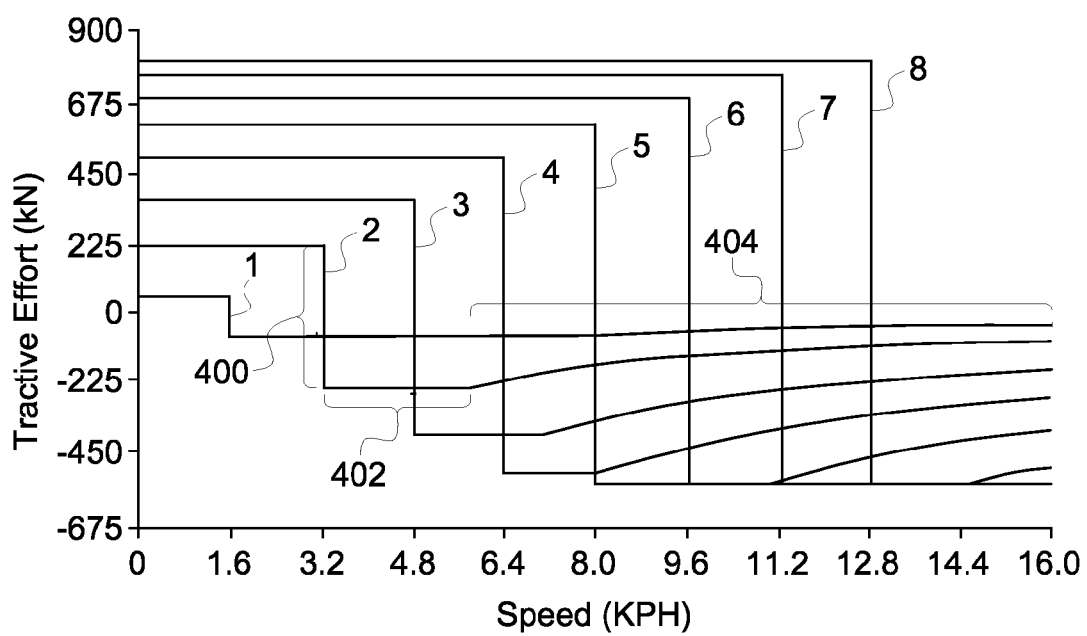
FIG. 4 provides a chart depicting the relationship between tractive effort and speed for eight notch settings of a throttle control device in a speed mode (one of the yard settings) in accordance with an embodiment of the inventive subject matter.

One example of speed mode embodiments is discussed in association with FIGS. 4-7. When set to this mode (whether by a touch key, a programmed soft key setting or by other user interface devices), each throttle notch setting respectively limits the TE to a predetermined level up to a predetermined speed, above which the TE is 'made negative' (such as by implementing braking) so as to regulate speed to a set point. In one embodiment, instead of the different notch settings being associated with different TE that is output by the vehicle, the different notch settings are associated with respective different speeds. For example, Notch 1 could be set to about ten percent of maximum TE up to 1.6 KPH, above which up to about ten percent of maximum braking effort is applied to limit the speed to within a small range centered about 1.6 KPH. As a result, setting the throttle to Notice 1 causes the vehicle to accelerate or decelerate to a first designated speed (e.g., 1.6 KPH) and remain at that speed until the throttle is moved to another notch setting. Thus, in this example of the speed mode, each notch setting designates a speed control set point having underlying limits on TE and braking effort (BE). This is shown in FIG. 4, where the notch settings 1.6-12.8, ranging from smaller to larger positive tractive efforts are set respectively to 1.6, 3.2, 4.8, 6.4, 8.0, 9.6, 11.2, and 12.8 KPH. Alternatively, one or more of the notch settings are associated with different speed control set points. The negative tractive efforts along the respective vertical lines (e.g., line 400) corresponding to these speeds represent braking efforts effectuated by a master controller of the vehicle to maintain the specified speed in this speed mode. The respective horizontal lines (e.g., line 402) leading to upward inflections (e.g., line 404) to the right, represent the respective negative tractive effort that would be applied if this specified speed is exceeded, such as due to sloping rail lines or other factors. The Dynamic Braking effort reductions signify power limits at respective notch settings that reflect limits of negative TE/braking. The numbers 1-8 shown alongside the various lines represent which notch settings of the vehicle that are associated with the tractive efforts and/or braking efforts shown by the lines. For example, the line for notch 1 shows a small, positive tractive effort until a speed of just below 1.6 KPH is achieved, followed by application of braking effort (e.g., the vertical line) to prevent the tractive effort from causing the vehicle to accelerate above the speed set point of 1.6 KPH. The line for notch 2 shows a larger, positive tractive effort until a speed of 3.2 KPH is achieved, followed by application of braking effort, followed by a gradual re-application of tractive effort.

Figure 5:
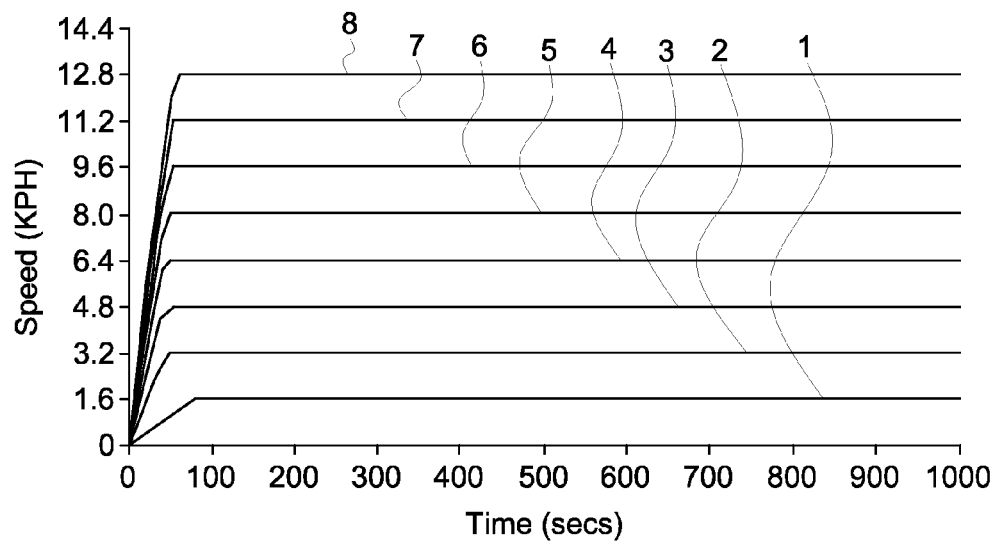
FIG. 5 provides a chart depicting the relationship between speed and time for the eight notch settings in the speed mode of FIG. 4.
Figure 6:
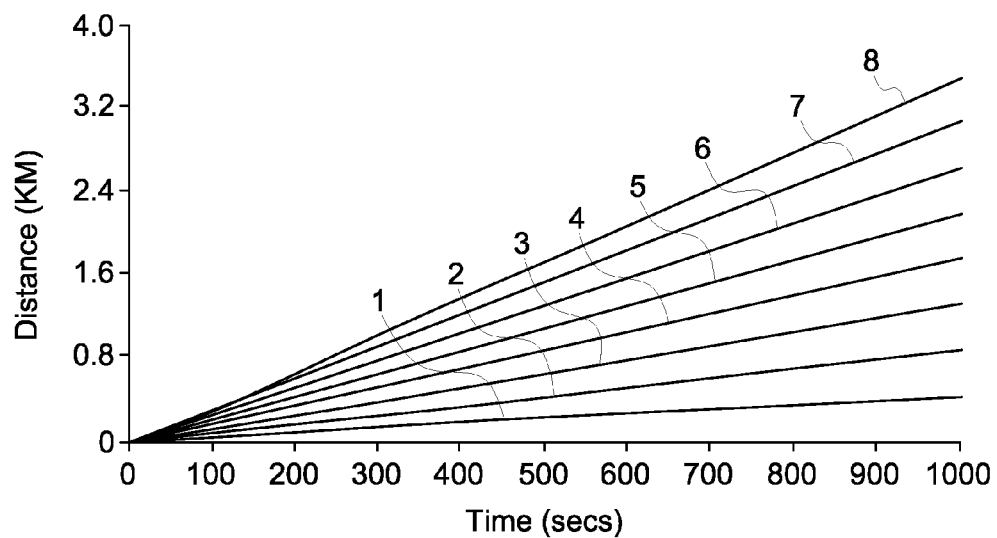
FIG. 6 provides a chart depicting the relationship between distance and time for the eight notch settings in the speed mode of FIG. 4.

FIG. 5 depicts the speed curve for each notch setting of FIG. 4, showing the stabilization of speed for each notch setting beyond an initial startup period. That is, FIG. 5 shows speeds of the vehicle increasing to a plateau, so that after an initial period of increasing speed, the speed for each notch setting stabilizes to a particular speed represented by a respective horizontal line. The lines 1-8 in FIG. 5 represent the speeds achieved by the notch settings and tractive/braking efforts associated with similarly numbered lines 1-8 in FIG. 4. FIG. 6 depicts the distance traveled over time for each notch setting of FIG. 4. For example, the lines 1-8 in FIG. 6 represent how far the vehicle has traveled with respect to time when using the notch settings and tractive/braking efforts associated with similarly numbered lines 1-8 in FIG. 4 and the speeds associated with the similarly numbered lines 1-8 in FIG. 5. FIG. 6 teaches that the time/distance relationship is linear after the speed stabilizes.

Master controllers of vehicles in speed-type alternative modes may alternatively reduce TE as the desired speed is being approached, rather than, or in addition to, applying braking effort. That is, in some speed mode embodiments, the controller may decrease TE when the desired speed is nearly attained, and/or may apply negative TE by applying brakes of one kind or another. As one example, the controllers may autonomously apply tractive effort until the vehicle reaches the speed set point associated with the selected notch setting. At that point in time, the controllers may autonomously apply braking effort and/or tractive effort to prevent the vehicle from traveling significantly faster than the speed set point (e.g., greater than a designated buffer threshold). Alternatively, the controllers may autonomously apply tractive effort until the vehicle is within a designated range of the speed set point, but not at or above the sped set point. At that point in time, the controllers may either continue to apply tractive effort at a lesser rate of acceleration and/or stop applying tractive effort such that the vehicle reaches and remains at the speed set point without application of braking effort. The decision whether to apply braking effort or not apply braking effort when achieving the speed set point associated with a notch setting may be based on a variety of factors, including the size of the vehicle (e.g., the length, weight, weight distribution, and the like), the grade and/or curvature of the route, and the like. For example, in a heavier vehicle, the controller may opt for the second of the two options above (e.g., not apply braking effort) and let the kinetic energy of the vehicle and/or a downward grade of the route cause the vehicle to reach the speed set point.

More generally as to any embodiment of the inventive subject matter, speed may be controlled by any of the following approaches: decrease of TE as a desired speed is approached, attained, or exceeded; going to idle as a desired speed is approached, attained, or exceeded; or applying dynamic braking, air brakes, or both, as a desired speed is approached, attained, or exceeded. Some such alternatives are presented in Table 1 and discussed below.

Figure 7:
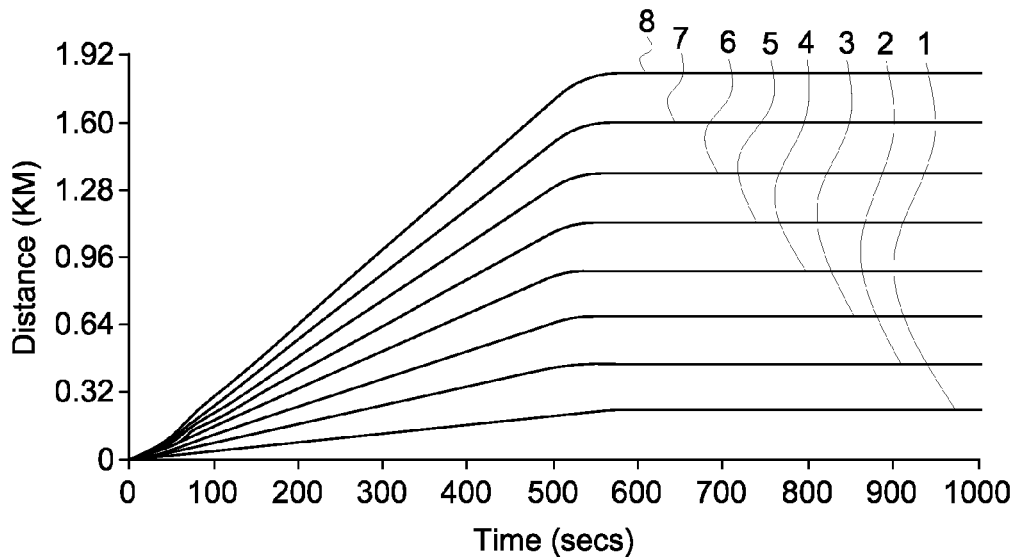
FIG. 7 provides a chart depicting the relationship between distance and time for the eight notch settings of a throttle control device in a distance mode (one of the yard settings) in accordance with an embodiment of the inventive subject matter.
Figure 8:
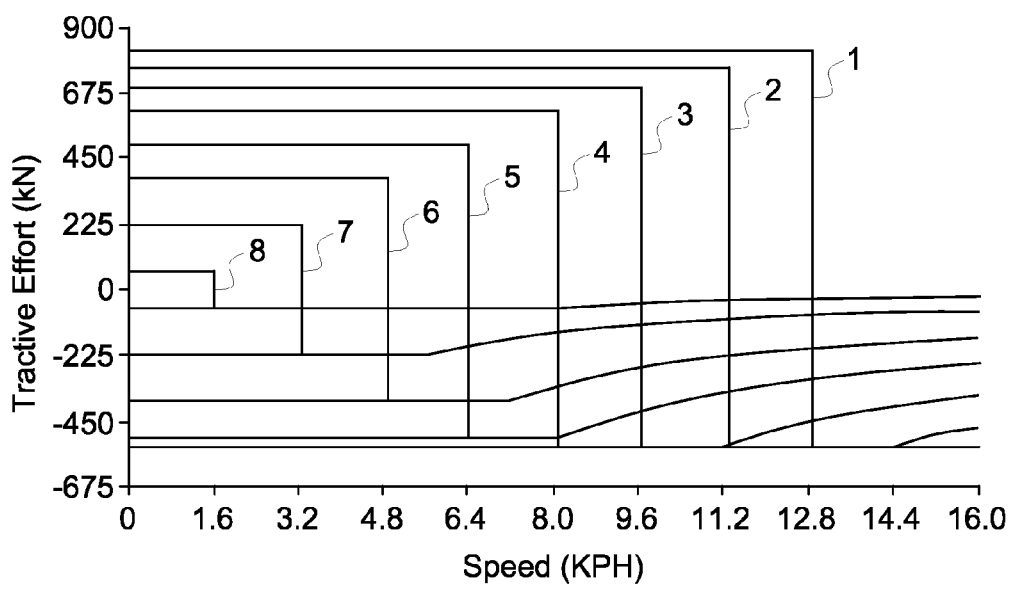
FIG. 8 provides a chart depicting the relationship between tractive effort and speed for the eight notch settings in the distance mode of FIG. 7
Figure 9:
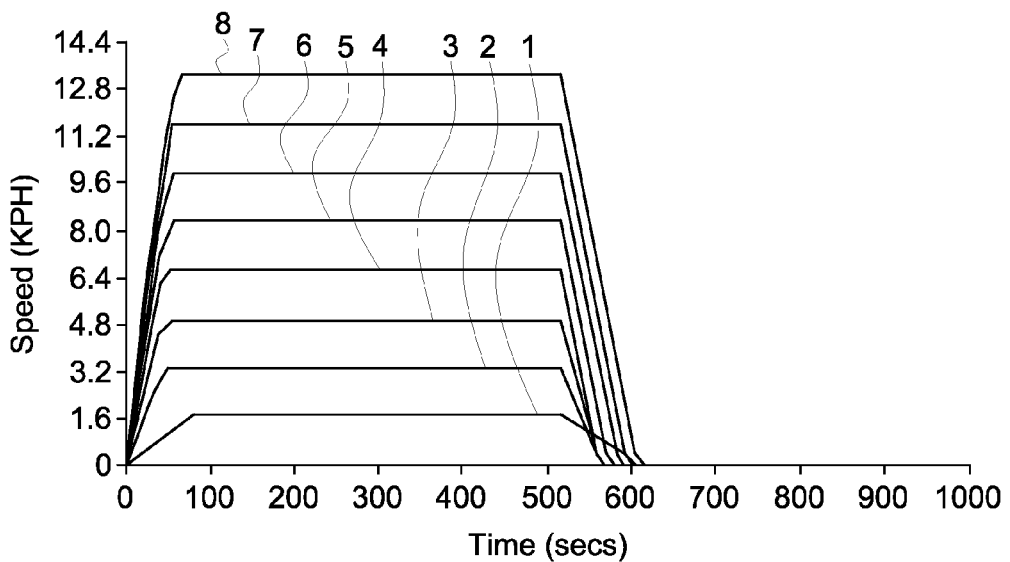
FIG. 9 provides a chart depicting the relationship between speed and time for the eight notch settings in the distance mode of FIG. 7.

One example of distance mode embodiments is discussed in association with FIGS. 7-9. In this mode, the operator estimates or determines the distance to be traveled by the vehicle for a particular purpose, and then uses the throttle handle or other mechanism to implement a command to the master controller to move the vehicle that distance. For example, instead of the different notch settings being associated with different speed set points, the different notch settings may be associated with different distances to be traveled by the vehicle. Manually or autonomously implementing a first notch setting of the vehicle may cause the vehicle to travel a first distance and stop, while implementing a different, second notch setting may cause the vehicle to travel a different, second distance and stop.

FIG. 7 provides an example of distances traveled over time in a distance mode embodiment in which each notch setting corresponds to a specified distance, or distance set point. Lines 1-8 in FIG. 7 correspond to the different notch settings of a controller in a vehicle. When notch setting 1 is automatically or manually selected, the controller directs a propulsion system (e.g. one or more motors) of the vehicle to propel the vehicle to a first designated distance set point, such as approximately 0.16 kilometers. When a different notch setting is selected (e.g., notch 3), the controller directs the propulsion system of the vehicle to propel the vehicle to another, different designated distance set point (e.g., 0.64 kilometers). When the vehicle reaches the designated distance associated with the selected notch setting, the controller causes the vehicle to stop movement, as shown in FIG. 7. FIG. 8 depicts tractive effort per notch setting when in the distance mode setting. In this example, negative tractive effort, in the form of braking, is applied to counter the respective tractive effort in order to maintain a desired speed profile during the period of operation to achieve the designated distance traveled. For example, lines 1-8 in FIG. 8 represent examples of the tractive efforts and/or braking efforts that are applied by the propulsion system of the vehicle (under the direction of the controller) to cause the vehicle to travel to the distance set point associated with the selected notch setting. The tractive and/or braking efforts shown with the lines 1-8 represent the efforts used to travel the distances associated with the similarly numbered lines 1-8 in FIG. 7. FIG. 9 depicts examples of speeds at which the controller may cause the vehicle to travel in order to travel to the distance set point associated with the selected notch setting. The lines 1-8 in FIG. 9 represent examples of speeds at which the vehicle may travel in order to move the designated distances associated with the similarly numbered lines 1-8 in FIG. 7. As shown in FIG. 9, a relatively lower speed may be used for shorter distances (e.g., lines 1-4), and a relatively higher speed for longer distances (corresponding to the higher throttle notch settings, such as lines 5-8). In one embodiment, the speeds shown in FIG. 9 may be limits on how fast or slow the controller can cause the vehicle to travel in order to move the distance set point associated with the selected notch setting. For example, in notch setting 5, the controller may cause the vehicle to travel no faster than 8.0 KPH in order to travel 1.12 kilometers, as shown in FIG. 9. The controller also may prevent the vehicle from traveling slower than the speed limit and distance associated with a lower notch setting. For example, in notch setting 5, the controller may prevent the vehicle from traveling slower than 6.4 KPH, which is the speed limit associated with notch setting 4. The speed limits associated with the notch settings in the distance mode of operation may be different from the speed set points associated with the notches in the speed mode of operation described above. Additionally or alternatively, the speed limits of the distance mode of operation may be different than the speed limits of routes and/or yards that are established for travel of many vehicles on the routes. The speed limits of the distance mode may be determined by an algorithm, such as may be embodied in a computer software module. FIG. 7 demonstrates that once the respective distances are reached (between 500 and 600 seconds in this example), there is no more motion (at least until the next control command is given). In one embodiment, the speed limits may be non-zero speed limits. For example, when in the distance mode, the controller may prevent the vehicle from traveling at speeds below a non-zero speed limit. The different speed limits associated with the different throttle settings in the distance made may be presented to the operator of the vehicle (e.g., on a display or by being printed on the throttle control device) in terms of miles per hour and/or kilometers per hour, or in other units.

The embodiment of FIGS. 7-9 is illustrative and is not meant to be limiting on all embodiments of the inventive subject matter. For example, there need not be an upper and/or lower speed limit corresponding to each notch setting. In some distance mode embodiments, the controller may decrease tractive efforts of the vehicle when the desired distance is nearly attained, and/or may apply negative tractive efforts by applying brakes of one kind or another. For example, in one embodiment, the controller may decrease the tractive efforts provided by the vehicle when the vehicle is within a designated buffer distance from the distance set point of the selected notch setting. This buffer distance may change for different notch settings. Alternatively, different notch settings may have different buffer distances. The buffer distances may be based on a variety of factors or characteristics of the vehicle, such as the size of the vehicle (e.g., length, weight, weight distribution, and the like), the grade and/or curvature of the route, and the like. For example, larger buffer distances may be used for heavier vehicles and/or on sections of the route having negative grades. Also, a number of variations may be employed in distance mode embodiments in general. As but one example, regarding the end part of the distance to travel, when the specified distance is reached, the speed and tractive effort could be set to zero, and the vehicle may coast to a stop. Alternatively, and as described further below with regard to an optional couple detected stop feature, at or toward the end of the designated distance to travel (e.g., the distance set point of the selected notch setting), the speed could be lowered to a low designated value or limit to enable effective and smooth coupling of the vehicle with another vehicle or unit of a vehicle. These coordinated operations are controlled by the master controller, which receives needed input data and provides control signals to devices to control motoring, direction, and braking.

Optionally, air brakes could also be applied to regulate speed or to bring the vehicle to a stop. Other options include the use of a battery jog.

Per the above discussion related to FIGS. 7-9, each throttle notch setting respectively corresponds to a distance the locomotive is to travel. Each throttle notch corresponds to a specific distance that is pre-assigned.

The distance mode embodiment of FIGS. 7-9 is not meant to be limiting in other regards. In other embodiments, distances are manually established or configured by entry of distance data into one of a variety of user interface devices of a user operable mode selector. These include a keyboard or a data entry field in another data entry device, such as by multiple depressions of a designated touch key, a programmed soft key (such as corresponding to car lengths or specific distances), and other approaches of data entry or as may be later developed. It is noted that a soft key generally is considered to be a key whose function may vary depending on periodic programming of the key to change its function. As described below, a soft key may likewise be utilized as a touch key. The various approaches to data entry may be provided in embodiments in which the first mentioned approach, an established pre-assigned distance for each notch position, is not employed. For example, at a particular time units may be set by a soft key to be measured in car lengths, so the first notch corresponds to one car length, the second notch to two car lengths, and so forth. Car lengths may be a convenient unit of distance for use in yard operations. A resetting of the soft key may provide a different unit of distance to correspond with each notch setting. In the distance mode, the set distances of the notch settings may be achieved by the master controller's control of motoring functions taking into account data entry from sensors that indicate speed and/or distance traveled.

Further as to another distance mode embodiment, a distance set point may be set by the number of times a particular data input field (such as a touch or soft key for this purpose) is pressed or otherwise actuated, and in such cases the notch settings do not correspond to specific distances. In such cases any throttle notch setting may give full tractive effort and/or power. In another alternative, when distance is set by the number of times a particular data input field (such as a touch or soft key for this purpose) is pressed or otherwise actuated, then the notch settings may correspond to step-wise maxima tractive effort or power. In such an embodiment, a higher notch setting can provide more tractive effort and/or power to a particular maximum or other limit, and with a given load, the vehicle can reach the specified distance sooner and after having achieved a higher speed. Such embodiments may be considered a speed/distance hybrid approach.

In one embodiment, the controller may switch between modes. For example, upon attainment of a specified distance in the distance mode, or upon coming to a full stop in the speed mode, or upon pressing a touch key or other user-input device to change modes of the controller (e.g., turn off the distance or speed mode, or to return to a conventional mode where the different throttle settings represent different respective power outputs and/or tractive efforts), the master controller returns to default mode and thereafter interprets notch settings of the throttle control device to correspond to conventional mode and sends command signals accordingly. For example, when in the speed mode or distance mode, selecting a notch setting causes the vehicle to travel a respective designated speed or distance, as described above. Upon return to the default mode (also referred to herein as power mode), the notch settings no longer correspond to traveling designated speeds or distances, but correspond to a power output (e.g., tractive effort and/or tractive power) of the vehicle. In one embodiment, the throttle is returned to an idle position and then to a powered position before tractive power and/or tractive effort can be re-applied when switching between modes.

Figure 10A:
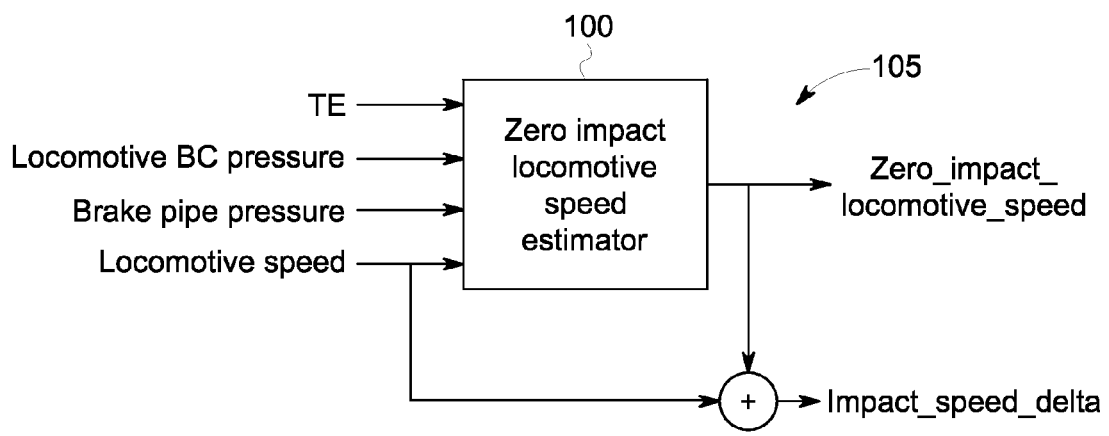
FIGS. 10A and 10B provide diagrammatic representations of data flow and operational sequencing for a couple detected stop feature.
Figure 10B:
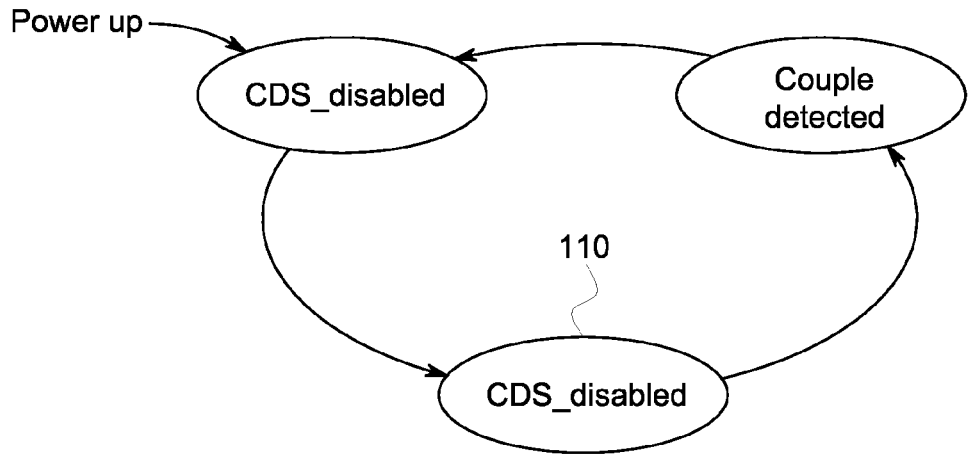

In one embodiment, a Couple Detected Stop ("CDS") feature may be provided with the speed, distance, or power modes of operation described above. The CDS feature may be provided as an algorithm within a master controller, as a software module for use in vehicle control systems, or in other forms such as part of a user-operable mode selector. FIGS. 10A and 10B depict non-limiting aspects of the CDS feature. FIG. 10A shows diagrammatically that one or more of TE, vehicle brake cylinder pressure, brake pipe pressure (e.g., of the brake air line to rail cars), and vehicle speed may provide data inputs to an estimator software module 100. The estimator module 100, which in various embodiments is installed and operative in the master controller, predicts, or estimates, a speed of operation for the vehicle (e.g., locomotive or train) if there were no impact. This is identified as the Zero Impact Vehicle Speed, and its determination may include consideration of various inputs, such as load (e.g., vehicle weight), incline of the route, curvature of the route, and/or other factors in addition to those already noted. An Impact Speed Delta can be calculated, which represents a change in speed under the current operating conditions that is associated with impact, and which is unrelated to internal forces or changes in internal forces. For example, in a scenario where a vehicle (e.g., a locomotive or other propulsion unit of a rail vehicle) is operating in a speed mode or distance mode of operation in order to move to and couple with another unit (e.g., a rail car or cars), the CDS feature may be used to precisely determine when the vehicle is coupled with the other unit or units. The Zero Impact Vehicle Speed is determined to represent the estimated speed of the vehicle as the vehicle moves toward the other unit or units and before the vehicle impacts or is coupled with the other unit or units. The Impact Speed Delta represents at least one of an estimated change (e.g., decrease) in the actual speed of the vehicle when the vehicle contacts (e.g., impacts and couples with) the other unit or units. Alternatively, the Impact Speed Delta may represent a designated speed difference that, when the actual vehicle speed decreases by at least the designated speed difference within a relatively short designated time period, the controller may determine that the vehicle has impacted and/or coupled with the other unit or units. The change in the actual speed of the vehicle when the vehicle impacts the other unit or units may be caused by a significant change in the inertia of the vehicle. For example, prior to coupling, the vehicle (which can include a propulsion unit such as a locomotive alone or the propulsion unit and one or more other units coupled thereto) may have a first inertia as the vehicle moves toward the units that are to be coupled with the vehicle. When the vehicle impacts the units, the speed of the vehicle may significantly decrease due to a relatively large increase in the inertia of the vehicle (e.g., because the mass of the vehicle has been increased due to the coupling of the additional units).

In one embodiment, if a negative speed change occurs and such negative change in speed is greater than the Impact Speed Delta, then a CDS module 105 (schematically depicted in FIG. 10A, which may include the estimator module 100) makes a determination that a coupling has resulted and communicates with other program(s) of the master controller (not shown, but see Example 1), which effectuate(s) changes in operation to stop movement of the vehicle in order to provide a relatively smooth coupling event. This filter may be effective, although it may tend, under certain conditions, to result in 'false coupling' events. In such case, the user or operator of the vehicle can then reset the system to restart the vehicle to achieve the desired coupling.

In another embodiment, and not to be limiting, a CDS software module (generally depicted as 110 in FIG. 10B, which shows operational sequencing performed by the module) may send a signal to initiate a coupling operational change when both of the following conditions are met: first, the change in speed exceeds the Impact Speed Delta (for example, 0.5 KPH where the estimator 100 has established 0.5 KPH as the speed associated with an impact, thereby exceeding all internal forces other than the impact of coupling) and second, the speed change is greater than the Zero Impact Vehicle Speed divided by a designated value, such as five (or another value).

The use of these two criteria can reduce false signals for a coupling event. The division by five is arbitrary and another fraction of the determined zero impact vehicle speed may be employed in various embodiments. Other filters and specific criteria may be used.

During operation with this embodiment, upon the master controller computing that both of these criteria have been met based on data received from a speed monitoring device(s) (e.g., one or more speed sensors coupled with traction motors, axles, wheels, and the like), the controller sends command signals to the propulsion system of the vehicle to cease application of tractive efforts and/or apply braking.

Figure 11:
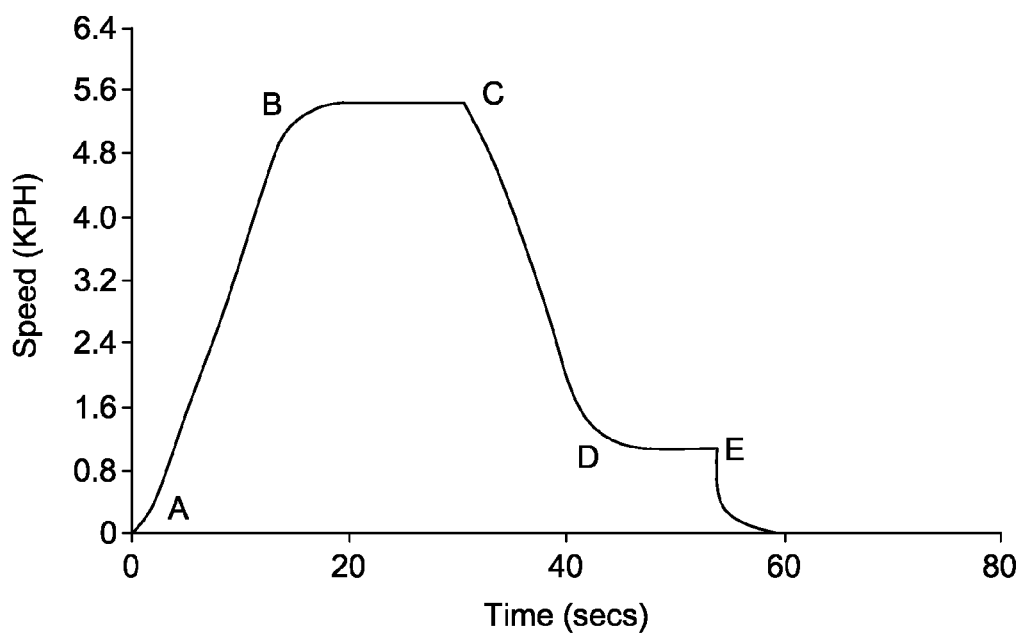
FIG. 11 provides a graph illustrating the speed to time relationship for a representative yard mode operation in conjunction with the couple detected stop feature.

FIG. 11 provides one example of the speed/time relationship of a vehicle during operation of the vehicle using a multi-mode throttle control device (e.g., the controller that is configured to operate in two or more of speed, distance, and/or power modes described above) of the inventive subject matter that includes a CDS embodiment. At the start of a sequence, the user or operator selects a first operational mode (e.g., speed, distance, or power) in which to operate the vehicle. In one embodiment, the operator selects the distance yard-type mode by depressing a distance touch key on a display in the vehicle or on a remote control unit (that remotely controls operations of the vehicle from a location that is off-board the vehicle), and then moves the throttle handle (or other control on the remote control unit) to a notch setting that corresponds to the distance, speed, or power output (e.g., tractive effort and/or tractive power) desired from the vehicle. For example, in the distance mode, the operator may select a notch setting that corresponds to the distance that the operator wants the vehicle to travel in order to connect with one or more other units (e.g., rail cars) that are approximately the same distance away from the vehicle. The user also may enable the CDS feature of the controller of the vehicle by selecting a touch key on the display (although any other switch or user interface device may be used).

Based on the controller being set to the distance mode, the controller interprets the notch setting selected by the operator and communicates control signals to the propulsion system of the vehicle to provide positive tractive effort to attain a desired speed (shown at point B). The controller then sends control signals to initiate braking (and/or reduce positive tractive effort) to maintain the desired speed (here, about 5.5 KPH) until the specified distance is reached (e.g., the distance that corresponds with the selected notch setting, which is shown at point C in FIG. 11). When the vehicle reaches or nears the desired distance, a change in motoring and/or braking is effectuated by the controller to slow the vehicle (e.g., between points C and D) to a desired coupling speed, shown in FIG. 11 as about 1.1 KPH. This may be effectuated, respectively, by manually moving the throttle handle to a lower notch setting (when the distance is reached), or alternatively through programming in the distance mode of operation (e.g., to reach a distance represented by point D). When a coupling is detected, based on the negative speed change exceeding the Impact Speed Delta determined by the estimator 100, the controller sends control signals to remove positive tractive effort and/or apply braking. This achieves the desired coupling and stops the vehicle.

The description above for FIG. 11 is not meant to be limiting. For example, the operating mode may be speed, not distance, so that at point C, the user moves the throttle to a lower notch setting to decelerate the vehicle to the lower speed. The CDS is enabled with this speed mode, and the same sequence of operations stops the vehicle following coupling at point E. Also, a CDS feature, such as embodied in a software code operable in a computer-operated device, may be provided for a vehicle independently of embodiments of multi-mode control systems. For such CDS embodiments, it is appreciated that at least one technical effect of these computer-implemented embodiments is to provide for one or more ways to stop a vehicle upon detection of speed changes indicative of a coupling event. Such stopping of the vehicle can provide for faster and/or more reliable coupling of the vehicle with one or more additional units. For example, allowing an operator of the vehicle to select the notch setting that causes the vehicle to travel approximately the same or the same distance as the vehicle is separated from additional units to be coupled with the vehicle can allow for the operator to more quickly couple the vehicle with the units, as the operator may be less concerned with striking the units with a vehicle moving too fast.

In the discussions above the setting to one of the operating modes was stated to be effectuated by setting a touch key, a programmable soft key or by other user interface devices, including other approaches of data entry or as may be later developed. More particularly, in various embodiments a touch key, such as a defined area located on a display device in communication with the master controller, may be contacted to perform a desired function as is indicated on the display adjacent to the button. For example, a display may be provided that has respective defined areas and labels for speed mode, distance mode, and/or power mode. Upon pressing one such area, this is detected and an appropriate control signal is sent to the master controller of the vehicle. In some embodiments, upon pressing the distance mode key other touch keys, with corresponding labels, may be presented to allow selection of specific distances. These or other touch keys may be pressed sequentially to obtain a desired number of distances, for instance rail car lengths, corresponding to the number of times the respective key is sequentially struck. A portion of the display may show the total number of distance intervals selected, and another portion of the display may indicate the remaining number of distance intervals still to be traveled, so the locomotive operator may choose to alter his distance interval command if he/she obverses the original distance instruction was not correct. One example of this is discussed in relation to FIG. 13 below. Also, modifying the distance interval command after the locomotive has begun the movement may be done by touch keys, or by canceling that command and initiating a new command with the touch keys. A soft key, whose function may vary depending on periodic programming of the key, may likewise be utilized as described above for a touch key.

For any of these alternatives, upon pressing the desired touch or soft key or keys, once or a multiple number of time, control signals are sent from the display to the master controller, and the master controller sends out an appropriate set of command signals to effectuate the desired mode, distances, etc. Also, the operation of the touch and the soft keys may be by any known uses of software and/or hardware to present the soft keys and associated labels to identify the soft key function(s). It is acknowledged that some soft key set-ups in some embodiments may use a single defined area of a display for a soft key that may be alternatively set to more than one mode, and the function of this soft key at any one time may vary depending on the setting of this defined area by a command from a keyboard or other input device. Without being limiting, however, it is believed that having two separate defined areas, one for speed mode and one for distance mode, may be more suited to routine operator use, as there would be an association with a particular location on the display for a particular mode. Nonetheless, a single soft key defined area may be used for the distance mode, and upon switching to distance mode the same soft key may be used to indicate the number of distance intervals to travel. In such case a change in color of a border of the defined area, or other change in identifiers, may facilitate proper use of the soft key system.

More broadly, any form of touch keys or soft keys, or other approaches to send signals to the master controller, may be employed in embodiments of the presently described inventive subject matter. Among the other approaches, not to be limiting, are digital control dials, mouse or joystick, wayside radio control, other radio control devices, voice-operated and other operator interface devices suitable for use in a vehicle cab or for use from a remote location relative to the cab. In that all of these are effective to change vehicle operation from one mode to another mode, these are generally defined as user-operable mode selectors for the purposes of the present disclosure, and for the claims provided herewith.

Also, in addition to the distance measurement approaches described above, radar, other relative proximity measurement devices (e.g., optical sensors, such as cameras, light detection and ranging, or the like), and global positioning systems (GPS) measurements may be utilized in determining and setting distances to be traveled and/or modes in which to operate. Although not shown in the Figures, one or more distance measuring sensors such as those described above may be included in the vehicle, such as by being mounted in positions to allow the detection of how far the vehicle has traveled and/or how far the vehicle is from another unit to which the vehicle is to couple. For example, a distance sensor, such as an optical sensor or a radar sensor, a force sensor (e.g., a sensor that measures coupling forces in a coupler that is used to join the vehicle with the other unit), or the like, can be coupled at an end of the vehicle that is to couple with the unit. Such sensors can be used by the control system to monitor when the vehicle couples with the unit, such as by detecting when the vehicle is within a designated distance from the unit and/or when the forces exerted on a coupler between the vehicle and the unit exceed or fall below a designated value. These may be integrated to provide data inputs and feedback systems to determine, set, and/or modify distances to be traveled with use of the user-operable mode selector. Further, with use of such approaches, more precise and/or absolute locations are determinable and this advances the art of yard operations including coupling using embodiments of the inventive subject matter. In one embodiment, the controller may automatically switch between operating modes based on a geographic location of the vehicle. For example, when the vehicle is outside of a yard, such as a rail yard, the vehicle may operate in the power and/or speed mode. When in the yard, however, the controller may automatically switch to operating in the distance mode.

The above discussion provides operational features of various embodiments of the inventive subject matter. The following, not meant to be limiting, provides a specific example of how one of these embodiments may be implemented in a vehicle, such as a locomotive. Further discussion is provided following this example. Not all embodiments, however, are limited to locomotives. Other vehicles may be used.

Example 1

Figure 12A:
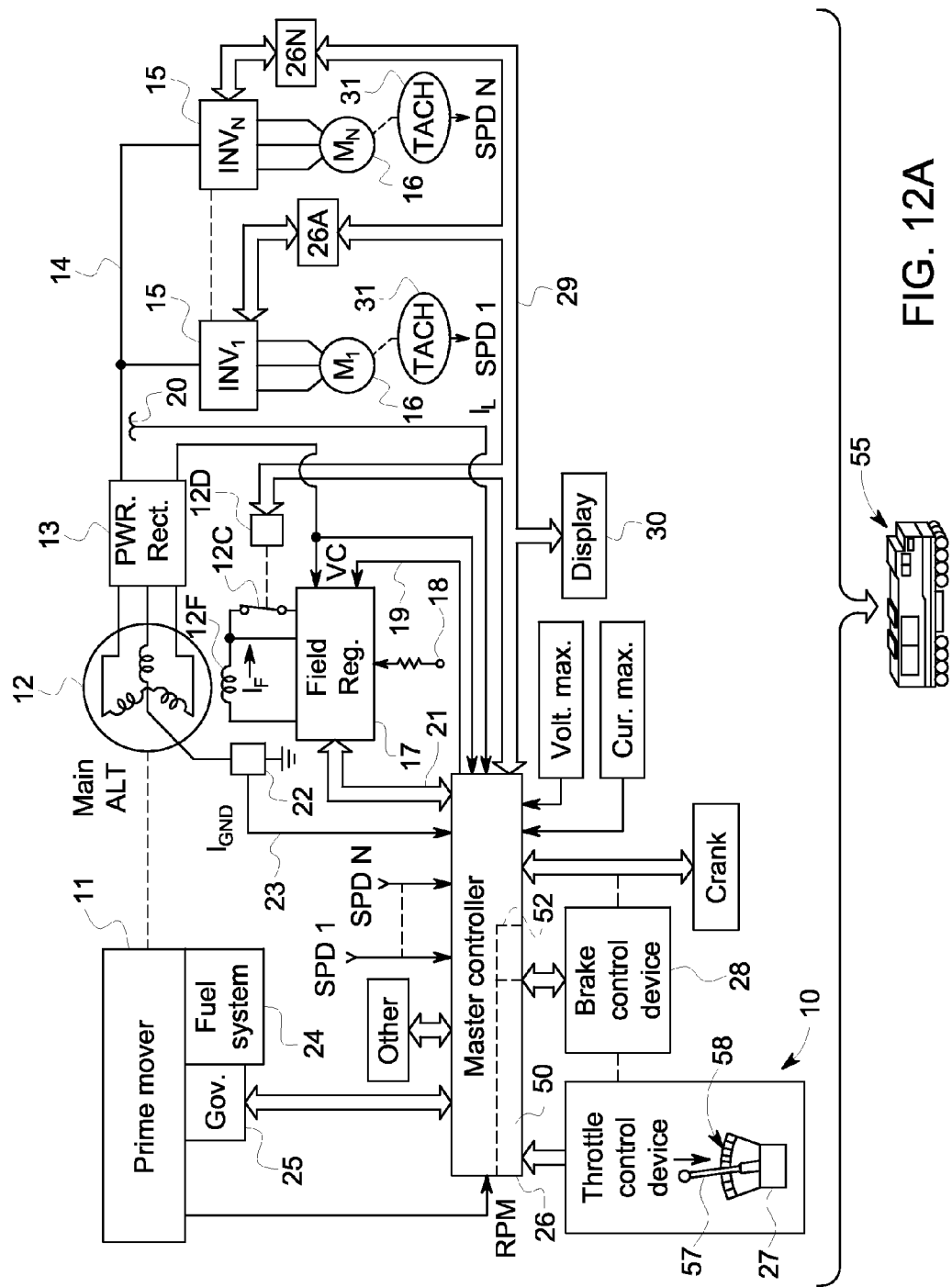
FIG. 12A provides a simplified block diagram of an electrical propulsion system for a diesel electric locomotive discussed in Example 1.

The following discussion, in conjunction with FIG. 12A, illustrates one embodiment 10 of the inventive subject matter as it may be employed with related components associated in a locomotive 55, such as a diesel electric. This example is meant to be illustrative but not limiting.

As a general review, in a diesel electric locomotive 55, a propulsion system that includes a thermal prime mover (typically a 16 cylinder turbo-charged diesel engine) is used to drive an electrical transmission including a synchronous generator that supplies electric current to a plurality of alternating current (AC) traction motors whose rotors are drivingly coupled through speed reducing gearing to the respective axle wheel sets of the locomotive. The generator typically includes a main three-phase traction alternator, the rotor of which is mechanically coupled to the output shaft of the diesel engine. When excitation current is supplied to field windings on the rotating rotor, alternating voltages are generated in three-phase armature windings on the stator of the alternator. These voltages are rectified to produce a controlled amplitude DC voltage and then applied to one or more PWM (pulse width modulation) inverters which control the effective frequency of alternating current to be supplied to the armature windings of the AC traction motors. The effective AC excitation frequency produced by the inverters controls the speed of the AC motors with power being controlled by pulse width modulation of the AC waveform.

More particularly as to the present example, the propulsion system shown in FIG. 12A includes variable speed prime mover 11 mechanically coupled to the rotor of a dynamoelectric machine 12 including a three-phase alternating current (AC) synchronous generator, also referred to as a main traction alternator. The main alternator 12 has a set of three star connected armature windings on its stator. In operation, it generates three-phase voltages in these windings, which voltages are applied to AC input terminals of at least one three-phase double-way uncontrolled power rectifier bridge 13.

In a conventional manner, the bridge 13 is formed by a plurality of pairs of power diodes (not shown explicitly), each such pair of diodes being associated with each of the three different phases of the main alternator 12. The diodes in each pair are serially connected between relatively positive and negative direct current (DC) output terminals of the rectifier bridge 13, and their junction is connected by a protective fuse (not shown) to the respectively associated AC input terminal of the bridge. The output of the bridge 13 is electrically coupled, via DC bus 14, in energizing relationship to a plurality of parallel connected, electrically controllable inverters 15, only two of which are shown in the illustrated embodiment. The inverters 15 are conventional three-phase pulse width modulated (PWM) inverters having a plurality of pairs of controllable rectifiers (not shown explicitly) connected in such a manner that by controlling the time at which each of the rectifiers is gated into conduction one is allowed to control the output frequency voltage and power supplied by the inverters. The three-phase outputs of the inverters are connected to corresponding ones of the adjustable speed AC traction motors 16. Prime mover 11, alternator 12 and rectifier 13 are suitably mounted on the platform (not shown explicitly) of a self-propelled 4-axle or 6-axle diesel electric locomotive (not shown apart from indicated components). A locomotive platform is in turn supported on two trucks (not shown), each having two or more wheel axle sets. A separate one of the traction motors 16 is hung on each axle and its rotor is mechanically coupled via conventional gearing in driving relationship to the associated axle wheel set. Suitable current sensing means 20 is coupled to the DC bus 14 to provide a current feedback signal IL that is representative of the magnitude of current supplied by the power rectifier 13.

The main alternator 12 of the power rectifier 13 serves as a controllable source of electric power for the traction motors. The magnitude of output voltage or current of the source is determined and varied by the amount of excitation current supplied to field windings 12F on the rotor of the main alternator. These field windings are connected for energization to the output of a suitable source 17 of regulated excitation current $I_F$. The connection between the field windings 12F and the excitation current source 17 includes a contact 12C of a conventional electromechanical field switch. The field switch has a control device 12D for moving it to a first or normal state in which the contact 12C is closed and freely conducts excitation current and for causing the switch to change between its first state and its second or alternative state in which the contact 12C is open and excitation current is effectively interrupted.

The excitation current source 17 may include a three-phase controlled rectifier bridge having input terminals 18 which receive alternating voltage from a prime mover driven auxiliary alternator that can actually include an auxiliary set of three-phase armature windings on the same frame as the main alternator 12. This source 17 is labeled field regulator in FIG. 12A. It includes conventional components for varying the magnitude of direct current $I_F$ supplied to the alternator field windings 12F (and hence the output of the alternator 12) as necessary to minimize any difference between the value of a variable control signal VC on an input line 19 and a feedback signal which during motoring is representative of the average magnitude V of the rectified output voltage of the main alternator 12. The voltage V is sensed by a conventional voltage sensing module (not shown) connected across the DC output terminals of the power rectifier.

The current detecting or current monitoring device 20 is connected to monitor the current on the bus 14 supplied to the inverters 15. The monitor 20 provides a feedback signal representative of the magnitude of current supplied by the power rectifier 13 to the motors 16.

The prime mover 11 that drives the alternator field 12F may be a thermal or internal combustion engine or equivalent. In the present example, the motive power (e.g., tractive effort and/or tractive power) is provided by a high power, turbocharged, 16 cylinder diesel engine. Such an engine has a fuel system 24 that includes a pair of fuel pump racks for controlling how much fuel oil flows into each cylinder each time an associated fuel injector is actuated by a corresponding fuel cam on engine cam shafts. The position of each fuel rack, and hence the quantity of fuel supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed call signal received from an associated master controller 26, which signal is herein called speed-type command signal. An engine speed signal (such as in revolutions per minute, RPM)

indicates the actual rotational speed of the engine crankshaft and hence the alternator field. The speed-type command signal for the engine governor system 25 and the excitation-type command signal VC for the alternator field current source 17 are provided by the master controller 26. A ground 22 communicates with the main alternator 12, and with the master controller 26 via an electrical conduit 23.

Further to components that more directly relate to aspects of the inventive subject matter, in a conventional motoring or propulsion mode of operation, the values of these signals are determined by the position of a throttle handle 57 (see inset) of a manually operated throttle control device 27 to which the master controller 26 is communicatively coupled, such as by being electrically coupled. In one embodiment, the throttle control device 27 has eight power positions or notch settings 58 (N) plus idle and shutdown. Alternatively, a greater or lesser number of settings may be provided. Power or notch position N1 corresponds to a first desired engine output (e.g., tractive effort and/or tractive power), while N8 corresponds to a larger desired engine output (e.g., tractive effort and/or tractive power). The various other notch settings between N1 and N8 correspond to other, different engine outputs. With the throttle in an idle position, the master controller 26 is operative to impose on the control signal VC a value corresponding to $I_F=0$, and no power output (e.g., no tractive effort and/or tractive effort) is produced by the main alternator 12. When the electrical braking of a moving vehicle is desired, the operator moves the throttle handle to the idle position and manipulates an interlocking handle of a companion brake control device 28 so that the master controller 26 is now supplied with a variable "brake call" command signal. The master controller 26 then sets up the alternator 12 for minimum voltage. The AC motors 16 each will then build up flux and act as a generator. The amount of braking torque is then controlled by controlling the slip frequency of the respective AC motor 16 by control of conduction of the respective inverted switching devices. In a train consist including two or more locomotives, only the lead unit is usually attended, and the controller on board each trail unit will receive, over train lines, encoded signals that indicate the throttle position or brake call selected by the operator in the lead unit.

Further to vehicle operation in the motoring or power mode, for each power level of the engine 12, there is a corresponding desired load. The master controller 26 is suitably arranged to translate the notch information from the throttle control device 27 into a reference signal value which establishes a voltage output from the alternator required by the motors in order to generate the torque or power being called for by the notch position. For this purpose, and for the purpose of deration (e.g., unloading the engine) and/or limiting engine speed in the event of certain abnormal conditions, it may be necessary to supply the master controller 26 with information about various operating conditions and parameters of the propulsion system, including the engine.

As illustrated in FIG. 12A, the master controller 26 receives the above-mentioned engine speed signal RPM, voltage feedback signal V, and current feedback signal $I_L$ which is representative of the magnitude of current supplied to the motors 16. The controller also receives a load controlled signal issued by the governor system 25 if the engine cannot develop the power demanded and still maintain the called for speed. The load control signal is effective, when issued, to reduce the power reference value in the controllers 26 so as to weaken the alternator field until a new balance point is reached. Additional data supplied to the master controller 26 includes "volt max" and "cur max" data that establish absolute maximum limits for the alternator output voltage and current respectively. The controller also receives "crank" data indicating whether or not an engine starting or cranking routine is being executed and relevant inputs from other selected sources, as represented by the block labeled "Other". Some of these selected sources are named and/or described in the discussion above this Example.

The alternator excitation source 17 and the master controller 26 communicate with each other via a multi-line serial data link or bus 21. The master controller 26 also communicates with the control device 12D that is operative, when energized in response to a "close" command from the controller, to move the field switch contact 12C to its closed position.

In the present Example as well as in other various embodiments, the master controller 26 includes a microcomputer, such as a coordinated system of commercially available components and associated electrical circuits and elements that can be programmed to perform a variety of desired functions. In a typical microcomputer, a central processing unit (CPU), or processor, executes an operating program stored in an erasable and electrical reprogrammable read only memory (EPROM) which also stores tables and data utilized in the program. Contained within the CPU are conventional counters, registers, accumulators, flip-flops (flags), etc. along with a precision oscillator which provides a high frequency clock signal. The microcomputer also includes a random access memory (RAM) into which data may be temporarily stored and from which data may be read at various address locations determined by the program stored in the EPROM. These components are interconnected by appropriate address, data and control buses, one of such buses being indicated at 29 and shown connecting signals from the master controller 26 to the inverters 15, the control switch 12D and a display 30. The microprocessor used in the master controller 26 is a conventional processor of the type available from Intel Corporation, but may alternatively be of an alternative type available from Motorola, Inc. Furthermore, while the master controller 26 is capable of controlling each of the inverters 15, it is desirable to provide a distributed process control arrangement in which the individual inverters are controlled by process controllers 26A-N, where N represents the number of inverters 15. Each controller 26A-N is coupled to each other controller by the serial data link or bus 29 so that each controller has access to at least speed feedback data from the other controllers. In the distributed system, many of the functions previously performed by master controller 26 are implemented at the local level by controllers 26A-N. More particularly, the torque calculations and gate turn-on, turn-off times of the switching devices in inverters 15 are implemented at controllers 26A-N. However, for ease of description, it is presumed that a single master controller 26 performs all torque and switching commands. Further, it is appreciated that this arrangement, as well as other arrangements described in this Example, are meant to be examples and not limiting of the scope of the inventive subject matter.

Specific to this Example depicted in FIG. 12A, the master controller 26 is programmed to produce, in the motoring mode of operation, a control signal value on the line 19 that varies as necessary to zero any error between the value of the alternator voltage feedback signal V and a reference value that normally depends on the throttle position selected by the operator and the tradition power output of the main alternator. One method for implementing this control function is disclosed in U.S. Pat. No. 4,634,887. In order to implement an electrical braking mode of operation, the controller 26 is programmed to vary the conduction of the switching devices in the inverters in a manner to vary or control the slip frequency of the AC motors. The master controller 26 also provides the signals necessary to control the timing of the firing of the rectifier devices within the inverters 15 in such a manner as to establish a desired frequency of operation of the power supplied by the inverters 15 to the motors 16 so as to control the speed of the locomotive. Suitable feedback devices are also provided from the wheel axle sets of the vehicle by devices 31 that may be conventional tachometers (identified in FIG. 12A as "TACH") respectively providing signals SPD 1 to SPD N to the master controller 26. Conventionally, each wheel axle set may be associated with a separate tachometer or other speed sensor device to provide multiple signals indicative of speed and direction of rotation to the controller so as to be able to obtain synchronous frequency to control torque and to be able to detect wheel slip or slide conditions.

Further, while the above description of the master controller 26 implies that this controller is strictly a voltage or current regulator, it will be appreciated that the conventional controller while regulating voltage and current output of the alternator 12 typically utilizes calculations of the actual power delivered to the motors 16 and by the actual power or torque developed by the motors 16. Power and torque are quantities that are calculated within the master controller 26 from the values of voltage and current supplied to the motors. Furthermore, each motor may also be supplied with flux sensing windings to enable a direct measurement of power being developed within the motors by measurement of motor flux or, alternatively, the terminal voltage and motor current is measured and used to estimate the power developed by the motors. Torque or tractive effort (TE) can be estimated from the integral of voltage multiplied by current. However, one generally calculates torque by dividing power by speed.

The above paragraphs in this Example describe the operational signaling among the vehicle components to effectuate powering and braking. It is appreciated that suitable implementation of computer software code, such as in the form of computer software modules, in the master controller 26 may provide for locomotive multi-mode operation. That is, the master controller 26 is adapted to receive control signals and other inputs, and to send command signals in accordance with the principles discussed above to effectuate conventional motoring mode, speed control mode, distance control mode, speed control with couple detected stop, distance control with couple detected stop, distance control followed by speed control, and distance control followed by speed control with couple detected stop. For purposes of identification, and not to be limiting, a user-operable mode selector 50 is associated with a dashed section of the rectangle including master controller 26. This is depicted to indicate that software modules of the user-operable mode selector 50 may be incorporated within, or may operate separately from (but communicate with), the master controller 26. Further, it is appreciated that the user-operable mode selector identified as 50 additionally includes a user interface device (such as described in the paragraph below) and electrical connections there between. Similarly depicted is an optional couple detected stop (CDS) module 52; its functions and ranges of embodiments are described elsewhere.

Figure 12B:
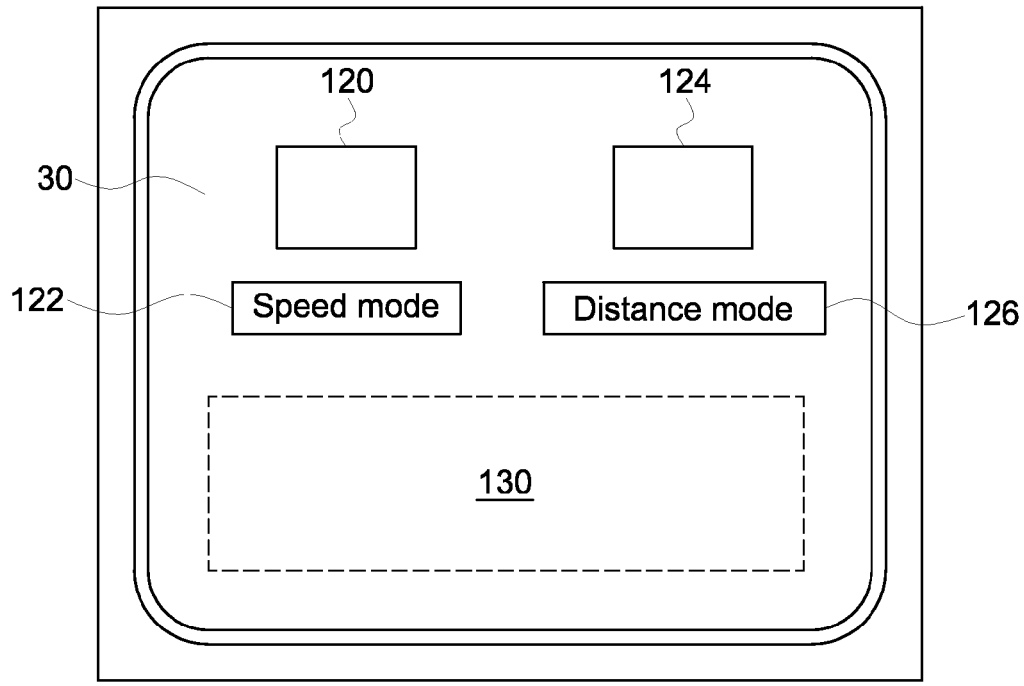
FIG. 12B provides a close-up depiction of the display shown in FIG. 12A.

FIG. 12B provides an enlarged view of the display 30 which in this Example has touch keys 120 and 124 as user interface devices for implementation of alternative modes of the multi-mode system. Touch key 120 is associated with a screen label 122 that indicates that touch key 120 is the key for setting the throttle control to Speed Mode. Touch key 124 is associated with a screen label 126 that indicates that touch key 124 is the key for setting the throttle control to Distance Mode. Remaining screen area 130 may provide other touch keys, or data display (such as speed, RPM, etc.).

When touch key 120 is pressed, the master controller 26 receives a signal indicating this selection, and thereafter, treats control signals from the throttle control device 27 to represent control signals for yard-suitable speeds rather than tractive effort or power. Then, when the throttle handle is placed in a specific notch setting, this results in a speed such as is associated with the speeds indicated in FIGS. 4-6. This relationship of throttle handle notch settings and yard-suitable speeds is maintained until another mode key is selected, or until touch key 120 is selected to turn this mode off.

Similarly, when touch key 124 is pressed, the master controller 26 receives a signal indicating this selection, and thereafter, treats control signals from the throttle control device 27 to represent control signals for yard-suitable distances rather than tractive effort or power. Then, when the throttle handle is placed in a specific notch setting, this results in the vehicle traveling a specific distance such as is associated with the distances indicated in FIGS. 7-9. This relationship of throttle handle notch settings and yard-suitable speeds is maintained until the distance is reached and another mode key is selected, or until touch key 124 is selected to turn this mode off. If the distance corresponding with the first set notch setting is reached, moving the throttle handle to another notch setting may provide for commands to be sent so the vehicle travels an additional distance.

The above Example is not meant to be limiting as far as the components that are connected together to achieve multi-mode throttle control, nor the arrangement and interrelationship of the components. Other components and arrangements thereof may be utilized to provide the multi-mode throttle control methods and systems of the inventive subject matter.

Multi-mode throttle control can also be applied to other vehicle types as well. These include DC traction type locomotives, Yard-switcher type locomotives, battery powered or hybrid battery/engine locomotives, or other non-locomotive types of vehicles.

Figure 13:
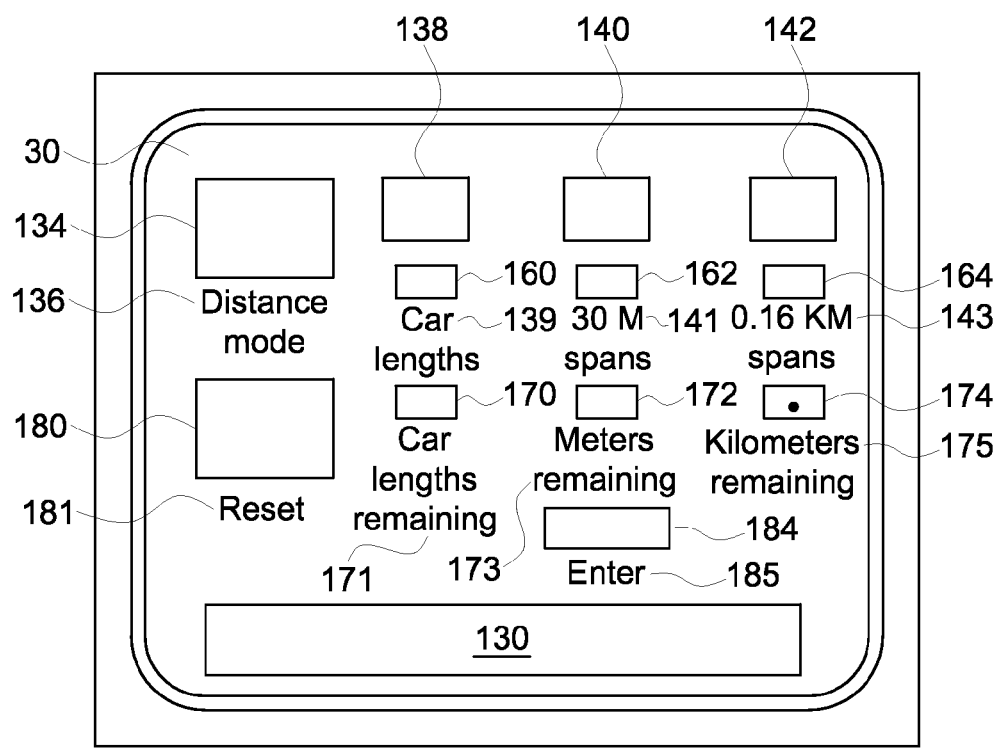
FIG. 13 provides a depiction of an alternative embodiment of a display including user interface features of the inventive subject matter.

FIG. 13 depicts an embodiment for an alternative approach to a user interface for the distance mode. A display 30 includes a distance mode touch key 134, which is associated with a screen label 136 that indicates that touch key 134 is the key for setting the throttle control to distance mode. When distance mode is activated by touching touch key 134, this results in the display 30 then displaying (or activating if these are kept on the display 30) additional specific-distance touch keys 138, 140, and 142, each associated with identifying distance parameter labels 139, 141, and 143. These and other data entry approaches and devices are generally considered to be data input fields. Each of these specific-distance touch keys 138, 140, and 142 represents a specific distance to travel in different distance units—standard car lengths, 30 meter spans, and 0.16 kilometer spans, which are identified by corresponding distance parameter labels 139, 141, and 143. In operation, an operator may select distance mode by pressing touch key 134, then enters a desired distance by pressing one of the additional specific-distance touch keys 138, 140, and 142 a desired number of times to obtain the desired distance. Data displays 160, 162, and 164 respectively display the total units input by the specific-distance touch keys 138, 140, and 142 (recognizing that only one would be operative for a specific command sequence). For example, pressing key 138 five times would set the distance to travel to 5 standard rail car lengths, and the number "5" would be displayed in data display 160.

Optional display fields 170, 172, and 174, and associated labels 171, 173, and 175, may be provided in some embodiments. These display fields receive data from the master controller (not shown) to indicate the distance units remaining to be traveled.

Alternative optional display fields (not shown) may provide data to show the distance already traveled. An optional touch key 180, with associated label 181, may be provided to send a reset signal to the master controller. Such a reset function may be provided with a time delay so that, for example, an operator has twenty seconds to enter a new distance upon realizing that the originally set distance is too long or too short based on observation or changes in circumstances. If a new distance is not entered after the allotted time, then the master controller may bring the locomotive to a stop. An optional "enter" touch key 184, associated with label 185, may be provided in various embodiments in which it is desired that this key be pressed after selection of the distance with one of specific-distance touch keys 138, 140, and 142, after which the control signal for such distance is communicated to the master controller. If such a key is not utilized, time delays or other suitable means may be programmed into the system to provide an allotted time span for data entry, after which the master controller effectuates the specific-distance control signals received during that span. Remaining screen area 130 may provide other touch keys, or data display (such as speed, RPM, etc.).

The discussion and Example provided above are meant to be illustrative and not limiting. Table 1 summarizes a range of alternative mode options for both distance and speed alternative modes.

power may be set by one or more of a touch key or other operator interface device. It is noted that the modes D1-D4 and S1-S3 may be provided in any combination in one or more embodiments of the inventive subject matter.

In one embodiment, the controller implements a selected mode (e.g., speed, distance, or default mode) based on manual selection of the mode by an operator disposed onboard the vehicle. Alternatively, the mode may be selected from an off-board location (e.g., a remote location), such as by a user-operable mode selector device that is not in the vehicle, such as by being outside of the cab of a locomotive. The user-operable mode selector device can be remote to the vehicle, such as by being used with a radio-controlled locomotive. Such a vehicle may be remotely controlled by a portable radio control device (such as a hand-held device), or may be controlled from a tower or other centralized or remote control structure (e.g., a wayside radio control). These and other out-of-cab alternatives are generally referred to as "off-board" locations and operations. It is appreciated that not only the user-operable mode selector, but also the throttle control device, may be placed off-board the vehicle, so that the vehicle is controlled remotely in regard to such controls.

The inventive subject matter described herein may be used to retrofit an existing vehicle with the ability to operate in two or more of the power, speed, and/or distance modes, with or without the couple detected stop aspect. For example, a controller of an existing locomotive may be re-programmed or updated with software that takes the control signals previously generated to cause the locomotive to operate at a des-

TABLE 1

| Alternative Mode Option | General Type of Control Mode | Function(s) of Throttle Handle set to particular Throttle Notch | | | | | Function(s) of Touch Keys, Soft keys or other operator interface devices | |
|---|---|---|---|---|---|---|---|---|
| | | Sets Distance Setpoint | Sets Speed Setpoint | Limits Speed | Limits TE | Limits power | Enables Yard-type Throttle to Alternative Modes | Other |
| D1 | DISTANCE | X | | X | X | X | X | Could also use to set Distance, Speed, TE or power limits if not already controlled by the throttle. |
| D2 | DISTANCE | X | | X | X | | X | |
| D3 | DISTANCE | X | | X | | | X | |
| D4 | DISTANCE | X | | | | | X | |
| S1 | SPEED | | X | X | X | X | X | |
| S2 | SPEED | | X | X | X | | X | |
| S3 | SPEED | | X | X | | | X | |

For alternative mode option D1, for example, when a touch key or other operator interface device, which functions as a user-operable mode selector, enables the D1 mode, the throttle handle set to a particular notch does all of the following: sets distance setpoint; limits speed; limits tractive effort; and limits power. An example of this is provided above in FIGS. 7-9 and the corresponding discussion. For alternative mode option D4, in contrast, when a touch key or other operator interface device, which functions as a user-operable mode selector, enables the D4 mode, the throttle handle set to a particular notch only sets the distance to be traveled. There is no limit on the speed, TE, or power, so that train speed may continue to accelerate until the distance is reached or nearly reached (in the latter case the particular embodiment allowing a coast to the distance). In such mode, the speed, TE, and/or ignated power output (e.g., an amount of tractive effort and/or tractive power) upon moving the throttle to a throttle setting, and changes these control signals into modified control signals. The modified control signals are communicated to the propulsion system of the locomotive to direct operations of the propulsion system. The control signals may be modified depending on the operating mode of the vehicle. For example, if the vehicle is in the speed mode, then the control signals may be modified to cause the propulsion system to move the vehicle at the designated speed associated with the selected notch setting, as described above. If the vehicle is in the distance mode, then the control signals may be modified to cause the propulsion system to move the vehicle the designated distance that is associated with the selected notch setting, also as described above. If the couple detected stop feature is implemented, then the control signals may be modified to cause the propulsion system to stop movement of the vehicle when coupling with other units is detected, as described above.

More generally, methods and systems described herein may be provided with one or more of the various speed, distance, and speed/distance hybrid modes. To achieve these modes, appropriate computer software codes, such as in the form of software modules, may be provided in or to communicate with the master controller, and appropriate connections are established between the master controller and sensors and operational devices. Thus, aspects of the inventive subject matter may be provided in the form of computer software code, such as in the form of one or more software modules. An apparatus, such as a data processing system, including a CPU, memory, I/O, program storage, a connecting bus, and other appropriate components, can be programmed or otherwise designed to facilitate the practice of the method of the inventive subject matter. Such a system can include appropriate programs for executing the methods described herein, such as by using one or more sets of instructions (e.g., computer software code) that is stored on a tangible and non-transitory computer readable storage medium for directing the controller to perform one or more operations described herein. Generally, it is appreciated that at least one technical effect of computer-implemented embodiments of the inventive subject matter include hardware and/or software aspects is to provide for one or more alternative operating modes in a vehicle multi-mode control system.

An article of manufacture, such as a pre-recorded disk or other similar computer program product, for use with a data processing system, can include a storage medium and programs (e.g., sets of instructions) recorded thereon for directing the data processing system to facilitate the practice of the inventive subject matter. Such apparatus and articles of manufacture also fall within the spirit and scope of the inventive subject matter.

The inventive subject matter may be practiced with various computer system configurations, including hand-held devices, multiprocessor systems, microprocessor-based or programmable consumer electronics, minicomputers, mainframe computers, and the like. The inventive subject matter may also be practiced in distributed computing environments where tasks are performed by remote processing devices that are linked through a communications network. In a distributed computing environment, program modules may be located in both local and remote computer storage media including memory storage devices.

In one embodiment, a control system for a vehicle includes a controller that is configured to be communicatively coupled with a throttle control device having multiple throttle settings and disposed onboard a vehicle. The controller also is configured to determine a selected throttle setting of the multiple throttle settings of the throttle control device and to operate in plural operating modes that include at least two of a power mode, a speed mode, or a distance mode. When the controller is operating in the power mode, the controller is configured to transmit control signals to a propulsion system of the vehicle that direct the propulsion system to generate an amount of at least one of tractive power or tractive effort that corresponds to the selected throttle setting. When the controller is operating in the speed mode, the controller is configured to transmit control signals to the propulsion system that direct the propulsion system to move the vehicle at a designated speed that corresponds to the selected throttle setting. When the controller is operating in the distance mode, the controller is configured to transmit control signals to the propulsion system that direct the propulsion system to move the vehicle a designated distance that corresponds to at least one of the selected throttle setting or to another operator input, and to stop the vehicle at the designated distance.

In one aspect, when the controller is operating in the speed mode, the controller is configured to direct the propulsion system to generate braking effort and the amount of at least one of tractive power or tractive effort to cause the vehicle to travel the designated speed.

In one aspect, when the controller is operating in the speed mode, the controller is configured to direct the propulsion system to at least one of accelerate or decelerate movement of the vehicle within designated respective acceleration or deceleration limits in order to direct the propulsion system to change an actual speed of the vehicle to reach the designated speed.

For example, acceleration and/or deceleration of the vehicle may be constrained to occur within previously defined upper and lower limits. Regardless of the actual speed of the vehicle, the controller may be prevented by these limits from causing the vehicle to accelerate or decelerate too quickly or too slowly in order to reach the designated speed that is associated with the selected throttle setting. Alternatively, the acceleration and/or deceleration limits may be different for different throttle settings. For example, for a first throttle setting, a first acceleration limit and/or a first deceleration limit may apply to limit how the controller accelerates or decelerates the vehicle in order to reach the designated speed associated with the first throttle setting that is selected. For a second throttle setting, a different, second acceleration limit and/or a different, second deceleration limit may apply to limit how the controller accelerates or decelerates the vehicle in order to reach the designated speed associated with the second throttle setting that is selected.

In one aspect, when the controller is operating in the distance mode, the controller is configured to direct the propulsion system to keep an actual speed of the vehicle between an upper speed limit and a lower speed limit. In one embodiment, at least one of the upper speed limit or the lower speed limit is associated with another throttle setting of the throttle control device.

In one aspect, when the controller is operating in the distance mode, the controller is configured to direct the propulsion system to keep an actual speed of the vehicle between an upper speed limit and a non-zero lower speed limit.

In one aspect, the lower speed limit is a non-zero speed limit, such as a speed that is greater than zero miles per hour or kilometers per hour (e.g., a stopped vehicle).

In one aspect, when the controller is operating in the speed mode, the designated speed is one of several designated speeds associated with respective different throttle settings of the multiple throttle settings of the throttle control device.

In one aspect, the multiple throttle settings correspond to the several designated speeds that are expressed to an operator of the vehicle in terms of at least one of miles per hour or kilometers per hour. For example, the designated speeds may be displayed on a display device or printed on the throttle control device in units of miles per hour and/or kilometers per hour.

In one aspect, when the controller is operating in the distance mode, the designated distance is one of several designated distances associated with respective different throttle settings of the multiple throttle settings of the throttle control device.

In one aspect, when the controller is operating in the distance mode, the controller is configured to direct the propulsion system to move the vehicle the designated distance that is based on the other operator input while also limiting an actual speed of the vehicle to be no greater than a speed limit associated with the selected throttle setting.

In one aspect, the controller is configured to detect when the vehicle couples with another vehicular unit and automatically stop movement of the vehicle in response thereto.

In one aspect, the controller is configured to detect when the vehicle couples with the vehicular unit based on a change in actual speed of the vehicle.

In one aspect, when the controller is operating in the distance mode, the control system is configured to cause the vehicle to travel the designated distance associated with the selected throttle setting toward the vehicular unit and to then reduce speed after moving the designated distance until coupling between the vehicle and the vehicular unit is detected.

In one aspect, the controller is configured to automatically stop movement of the vehicle by directing the propulsion system to at least one of remove the amount of at least one of tractive power or tractive effort that is applied by the propulsion system, apply independent air brakes of the vehicle, or apply train air brakes of the vehicle.

In one aspect, the controller is configured to operate offboard the vehicle.

In another embodiment, a control system for a vehicle includes a controller that is configured to be communicatively coupled with a throttle control device having multiple throttle settings and disposed onboard a vehicle and to determine a selected throttle setting of the multiple throttle settings of the throttle control device. The controller is further configured to operate in a power mode and a speed mode. When the controller is operating in the power mode, the controller is configured to transmit control signals to a propulsion system of the vehicle that direct the propulsion system to generate an amount of at least one of tractive power or tractive effort that corresponds to the selected throttle setting. When the controller is operating in the speed mode, the controller is configured to transmit control signals to the propulsion system that direct the propulsion system to move the vehicle at a designated speed that corresponds to the selected throttle setting.

In one aspect, when the controller is operating in the speed mode, the controller is configured to direct the propulsion system to generate braking effort and the amount of at least one of tractive power or tractive effort to cause the vehicle to travel the designated speed.

In one aspect, when the controller is operating in the speed mode, the controller is configured to direct the propulsion system to generate braking effort upon an actual speed of the vehicle reaching the designated speed.

In one aspect, when the controller is operating in the speed mode, the controller is configured to direct the propulsion system to at least one of accelerate or decelerate movement of the vehicle within designated respective acceleration or deceleration limits in order to direct the propulsion system to change an actual speed of the vehicle to reach the designated speed.

In one aspect, when the controller is operating in the speed mode, the designated speed is one of several designated speeds associated with respective different throttle settings of the multiple throttle settings of the throttle control device.

In one aspect, the multiple throttle settings correspond to the several designated speeds that are presented to an operator in terms of at least one of miles per hour or kilometers per hour.

In one aspect, the controller is configured to detect when the vehicle couples with another vehicular unit and automatically stop movement of the vehicle in response thereto.

In one aspect, the controller is configured to automatically stop movement of the vehicle by directing the propulsion system to at least one of remove the amount of at least one of tractive power or tractive effort that is applied by the propulsion system, apply independent air brakes of the vehicle, or apply train air brakes of the vehicle.

In one aspect, the controller is configured to operate offboard the vehicle.

In another embodiment, a control system of a vehicle includes a controller that is configured to be communicatively coupled with a throttle control device having multiple throttle settings and disposed onboard a vehicle and to determine a selected throttle setting of the multiple throttle settings of the throttle control device. The controller is further configured to operate in plural operating modes that include a power mode and a distance mode. When the controller is operating in the power mode, the controller is configured to transmit control signals to a propulsion system of the vehicle that direct the propulsion system to generate an amount of at least one of tractive power or tractive effort that corresponds to the selected throttle setting. When the controller is operating in the distance mode, the controller is configured to transmit control signals to the propulsion system that direct the propulsion system to move the vehicle a designated distance that corresponds to the selected throttle setting and stop the vehicle at the designated distance.

In one aspect, when the controller is operating in the distance mode, the controller is configured to direct the propulsion system to keep an actual speed of the vehicle between an upper speed limit and a non-zero lower speed limit.

In one aspect, when the controller is operating in the distance mode, the designated distance is one of several designated distances associated with respective different throttle settings of the multiple throttle settings of the throttle control device.

In one aspect, the controller is configured to detect when the vehicle couples with another vehicular unit and automatically stop movement of the vehicle in response thereto.

In one aspect, the controller is configured to detect when the vehicle couples with the vehicular unit based on a change in actual speed of the vehicle.

In one aspect, the controller is configured to automatically stop movement of the vehicle by directing the propulsion system to at least one of remove the amount of at least one of tractive power or tractive effort that is applied by the propulsion system, apply independent air brakes of the vehicle, or apply train air brakes of the vehicle.

In one aspect, when the controller is operating in the distance mode, the control system is configured to cause the vehicle to travel the designated distance associated with the selected throttle setting toward the vehicular unit and to then reduce speed after moving the designated distance until coupling between the vehicle and the vehicular unit is detected.

In one aspect, the controller is configured to operate offboard the vehicle.

In another embodiment, a method for controlling a vehicle includes communicatively coupling a controller with a throttle control device having multiple throttle settings and disposed onboard a vehicle, determining a selected throttle setting of the multiple throttle settings of the throttle control device, and controlling motive operations of the vehicle from the controller in a power mode and at least one of a speed mode or a distance mode. When operating in the power mode, the method includes transmitting control signals to a propulsion system of the vehicle that direct the propulsion system to generate an amount of at least one of tractive power or tractive effort that corresponds to the selected throttle setting. When operating in the speed mode, the method includes transmitting control signals to the propulsion system that direct the propulsion system to move the vehicle at a designated speed that corresponds to the selected throttle setting. When operating in the distance mode, the method includes transmitting control signals to the propulsion system that direct the propulsion system to move the vehicle a designated distance that corresponds to at least one of the selected throttle setting or another operator input, and to stop the vehicle at the designated distance.

In one aspect, when operating in the speed mode, transmitting the control signals causes the propulsion system to generate braking effort and the amount of at least one of tractive power or tractive effort to cause the vehicle to travel the designated speed.

In one aspect, when operating in the speed mode, the designated speed is one of several designated speeds associated with respective different throttle settings of the multiple throttle settings of the throttle control device.

In one aspect, when operating in the distance mode, the designated distance is one of several designated distances associated with respective different throttle settings of the multiple throttle settings of the throttle control device.

In one aspect, the method also includes detecting when the vehicle couples with another vehicular unit and automatically stopping movement of the vehicle in response thereto.

In one aspect, when operating in the distance mode, transmitting the control signals includes directing the propulsion system to move the vehicle the designated distance that is based on the other operator input while also limiting an actual speed of the vehicle to be no greater than a speed limit associated with the selected throttle setting.

In one aspect, when operating in the distance mode, transmitting the control signals includes directing the propulsion system to move the vehicle the designated distance that is based on the other operator input while also limiting an actual speed of the vehicle to be no greater than a speed limit associated with the selected throttle setting.

Also, when the term "user" is used above, this is meant to include a person operating the vehicle in the vehicle cab (or in a lead vehicle of a vehicle consist). However, this term also may apply to a person operating the vehicle remotely, such as from a remote location other than on the vehicle, such as by radio control devices. "User" and "operator" may be equivalent as used herein. Further, given the wide range of approaches in computer-implemented devices that can achieve functionally equivalent results, it is appreciated that the hardware operating the user-operable mode selector software may be incorporated in the master controller, or the user-operable mode selector software may reside at separate physical location(s).

While the inventive subject matter has been described in various embodiments, many variations and modifications will become apparent to one of ordinary skill in the art. Accordingly, it is intended that the inventive subject matter not be limited to the specific illustrative embodiments but be interpreted within the full spirit and scope of the appended claims.

The invention claimed is:

1. A control system comprising:
a controller configured to be communicatively coupled with a throttle control device having multiple throttle settings and disposed onboard a vehicle, the controller also configured to determine a selected throttle setting of the multiple throttle settings of the throttle control device, the controller further configured to operate in plural operating modes that include at least two of a power mode, a speed mode, or a distance mode,
wherein, when the controller is operating in the power mode, the controller is configured to transmit control signals to a propulsion system of the vehicle that direct the propulsion system to generate an amount of at least one of tractive power or tractive effort that corresponds to the selected throttle setting,
wherein, when the controller is operating in the speed mode, the controller is configured to transmit control signals to the propulsion system that direct the propulsion system to move the vehicle at a designated speed that corresponds to the selected throttle setting, and
wherein, when the controller is operating in the distance mode, the controller is configured to transmit control signals to the propulsion system that direct the propulsion system to move the vehicle a designated distance that corresponds to at least one of the selected throttle setting or to another operator input, and to stop the vehicle at the designated distance.

2. The control system of claim 1, wherein, when the controller is operating in the speed mode, the controller is configured to direct the propulsion system to generate braking effort and the amount of at least one of tractive power or tractive effort to cause the vehicle to travel the designated speed.

3. The control system of claim 1, wherein, when the controller is operating in the speed mode, the controller is configured to direct the propulsion system to at least one of accelerate or decelerate movement of the vehicle within designated respective acceleration or deceleration limits in order to direct the propulsion system to change an actual speed of the vehicle to reach the designated speed.

4. The control system of claim 1, wherein, when the controller is operating in the distance mode, the controller is configured to direct the propulsion system to keep an actual speed of the vehicle between an upper speed limit and a non-zero lower speed limit.

5. The control system of claim 1, wherein, when the controller is operating in the speed mode, the designated speed is one of several designated speeds associated with respective different throttle settings of the multiple throttle settings of the throttle control device.

6. The control system of claim 5, wherein the multiple throttle settings correspond to the several designated speeds that are presented to an operator of the vehicle in terms of at least one of miles per hour or kilometers per hour.

7. The control system of claim 1, wherein, when the controller is operating in the distance mode, the designated distance is one of several designated distances associated with respective different throttle settings of the multiple throttle settings of the throttle control device.

8. The control system of claim 1, wherein, when the controller is operating in the distance mode, the controller is configured to direct the propulsion system to move the vehicle the designated distance that is based on the other operator input while also limiting an actual speed of the vehicle to be no greater than a speed limit associated with the selected throttle setting.

9. The control system of claim 1, wherein the controller is configured to detect when the vehicle couples with another vehicular unit and automatically stop movement of the vehicle in response thereto.

10. The control system of claim 9, wherein the controller is configured to detect when the vehicle couples with the vehicular unit based on a change in actual speed of the vehicle.

11. The control system of claim 9, wherein, when the controller is operating in the distance mode, the control system is configured to cause the vehicle to travel the designated distance associated with the selected throttle setting toward the vehicular unit and to then reduce speed after moving the designated distance until coupling between the vehicle and the vehicular unit is detected.

12. The control system of claim 9, wherein the controller is configured to automatically stop movement of the vehicle by directing the propulsion system to at least one of remove the amount of at least one of tractive power or tractive effort that is applied by the propulsion system, apply independent air brakes of the vehicle, or apply train air brakes of the vehicle.

13. The control system of claim 1, wherein the controller is configured to operate off-board the vehicle.

14. A control system comprising:
a controller configured to be communicatively coupled with a throttle control device having multiple throttle settings and disposed onboard a vehicle, the controller also configured to determine a selected throttle setting of the multiple throttle settings of the throttle control device, the controller further configured to operate in a power mode and a speed mode,
wherein, when the controller is operating in the power mode, the controller is configured to transmit control signals to a propulsion system of the vehicle that direct the propulsion system to generate an amount of at least one of tractive power or tractive effort that corresponds to the selected throttle setting, and
wherein, when the controller is operating in the speed mode, the controller is configured to transmit control signals to the propulsion system that direct the propulsion system to move the vehicle at a designated speed that corresponds to the selected throttle setting.

15. The control system of claim 14, wherein, when the controller is operating in the speed mode, the controller is configured to direct the propulsion system to generate braking effort and the amount of at least one of tractive power or tractive effort to cause the vehicle to travel the designated speed.

16. The control system of claim 14, wherein, when the controller is operating in the speed mode, the controller is configured to direct the propulsion system to generate braking effort upon an actual speed of the vehicle reaching the designated speed.

17. The control system of claim 14, wherein, when the controller is operating in the speed mode, the controller is configured to direct the propulsion system to at least one of accelerate or decelerate movement of the vehicle within designated respective acceleration or deceleration limits in order to direct the propulsion system to change an actual speed of the vehicle to reach the designated speed.

18. The control system of claim 14, wherein, when the controller is operating in the speed mode, the designated speed is one of several designated speeds associated with respective different throttle settings of the multiple throttle settings of the throttle control device.

19. The control system of claim 18, wherein the multiple throttle settings correspond to the several designated speeds that are presented to an operator in terms of at least one of miles per hour or kilometers per hour.

20. The control system of claim 14, wherein the controller is configured to detect when the vehicle couples with another vehicular unit and automatically stop movement of the vehicle in response thereto.

21. The control system of claim 20, wherein the controller is configured to automatically stop movement of the vehicle by directing the propulsion system to at least one of remove the amount of at least one of tractive power or tractive effort that is applied by the propulsion system, apply independent air brakes of the vehicle, or apply train air brakes of the vehicle.

22. The control system of claim 14, wherein the controller is configured to operate off-board the vehicle.

23. A control system comprising:
a controller configured to be communicatively coupled with a throttle control device having multiple throttle settings and disposed onboard a vehicle, the controller also configured to determine a selected throttle setting of the multiple throttle settings of the throttle control device, the controller further configured to operate in plural operating modes that include a power mode and a distance mode,
wherein, when the controller is operating in the power mode, the controller is configured to transmit control signals to a propulsion system of the vehicle that direct the propulsion system to generate an amount of at least one of tractive power or tractive effort that corresponds to the selected throttle setting, and
wherein, when the controller is operating in the distance mode, the controller is configured to transmit control signals to the propulsion system that direct the propulsion system to move the vehicle a designated distance that corresponds to the selected throttle setting and stop the vehicle at the designated distance.

24. The control system of claim 23, wherein, when the controller is operating in the distance mode, the controller is configured to direct the propulsion system to keep an actual speed of the vehicle between an upper speed limit and a non-zero lower speed limit.

25. The control system of claim 23, wherein, when the controller is operating in the distance mode, the designated distance is one of several designated distances associated with respective different throttle settings of the multiple throttle settings of the throttle control device.

26. The control system of claim 23, wherein the controller is configured to detect when the vehicle couples with another vehicular unit and automatically stop movement of the vehicle in response thereto.

27. The control system of claim 26, wherein the controller is configured to detect when the vehicle couples with the vehicular unit based on a change in actual speed of the vehicle.

28. The control system of claim 26, wherein the controller is configured to automatically stop movement of the vehicle by directing the propulsion system to at least one of remove the amount of at least one of tractive power or tractive effort that is applied by the propulsion system, apply independent air brakes of the vehicle, or apply train air brakes of the vehicle.

29. The control system of claim 26, wherein, when the controller is operating in the distance mode, the control system is configured to cause the vehicle to travel the designated distance associated with the selected throttle setting toward the vehicular unit and to then reduce speed after moving the designated distance until coupling between the vehicle and the vehicular unit is detected.

30. The control system of claim 23, wherein the controller is configured to operate off-board the vehicle.

31. A method comprising:
communicatively coupling a controller with a throttle control device having multiple throttle settings and disposed onboard a vehicle;

determining a selected throttle setting of the multiple throttle settings of the throttle control device; and controlling motive operations of the vehicle from the controller in a power mode and at least one of a speed mode or a distance mode, wherein, when operating in the power mode, transmitting control signals to a propulsion system of the vehicle that direct the propulsion system to generate an amount of at least one of tractive power or tractive effort that corresponds to the selected throttle setting, wherein, when operating in the speed mode, transmitting control signals to the propulsion system that direct the propulsion system to move the vehicle at a designated speed that corresponds to the selected throttle setting, and wherein, when operating in the distance mode, transmitting control signals to the propulsion system that direct the propulsion system to move the vehicle a designated distance that corresponds to at least one of the selected throttle setting or another operator input, and to stop the vehicle at the designated distance.

32. The method of claim 31, wherein, when operating in the speed mode, transmitting the control signals causes the propulsion system to generate braking effort and the amount of at least one of tractive power or tractive effort to cause the vehicle to travel the designated speed.

33. The method of claim 31, wherein, when operating in the speed mode, the designated speed is one of several designated speeds associated with respective different throttle settings of the multiple throttle settings of the throttle control device.

34. The method of claim 31, wherein, when operating in the distance mode, the designated distance is one of several designated distances associated with respective different throttle settings of the multiple throttle settings of the throttle control device.

35. The method of claim 31, further comprising detecting when the vehicle couples with another vehicular unit and automatically stopping movement of the vehicle in response thereto.

36. The method of claim 31, wherein, when operating in the distance mode, transmitting the control signals includes directing the propulsion system to move the vehicle the designated distance that is based on the other operator input while also limiting an actual speed of the vehicle to be no greater than a speed limit associated with the selected throttle setting.

37. The method of claim 31, wherein, when operating in the distance mode, transmitting the control signals includes directing the propulsion system to move the vehicle the designated distance that is based on the other operator input while also limiting an actual speed of the vehicle to be no greater than a speed limit associated with the selected throttle setting.

* * * * *